(12) United States Patent
Kannoo et al.

(10) Patent No.: US 8,397,757 B2
(45) Date of Patent: Mar. 19, 2013

(54) MULTI-WAY SELECTOR VALVE

(75) Inventors: Takeshi Kannoo, Tokyo (JP); Hitoshi Umezawa, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 638 days.

(21) Appl. No.: 12/588,994

(22) Filed: Nov. 4, 2009

(65) Prior Publication Data

US 2010/0108925 A1    May 6, 2010

(30) Foreign Application Priority Data

Nov. 4, 2008  (JP) ................................ 2008-283597
Apr. 14, 2009  (JP) ................................ 2009-098188
Sep. 3, 2009  (JP) ................................ 2009-203926

(51) Int. Cl.
*F16K 11/074* (2006.01)

(52) U.S. Cl. ................................. 137/625.43

(58) Field of Classification Search ............. 137/625.43; 251/283
See application file for complete search history.

(56) References Cited

U.S. PATENT DOCUMENTS

| | | | | |
|---|---|---|---|---|
| 4,139,355 A | * | 2/1979 | Turner et al. | 62/324.6 |
| 5,755,111 A | * | 5/1998 | Toyama | 62/324.6 |
| 6,058,974 A | * | 5/2000 | Blomgren | 137/625.43 |
| 6,076,365 A | * | 6/2000 | Benatav | 62/160 |
| 6,234,207 B1 | * | 5/2001 | Toyama | 137/625.43 |
| 2007/0018128 A1 | * | 1/2007 | Arai | 251/129.11 |

FOREIGN PATENT DOCUMENTS

| | | |
|---|---|---|
| CN | 2 736 615 Y | 10/2005 |
| EP | 1 767 840 A2 | 3/2007 |
| GB | 928 299 A | 6/1963 |
| WO | 98/49475 A1 | 11/1998 |
| WO | 99/14519 A1 | 3/1999 |

OTHER PUBLICATIONS

Search Report issued on Feb. 8, 2010 in corresponding European application No. 09 17 4832.

* cited by examiner

*Primary Examiner* — John Fox
(74) *Attorney, Agent, or Firm* — Bacon & Thomas, PLLC

(57) ABSTRACT

To provide a multi-way selector valve properly used for a vehicle, with a smooth flow path switching operation even in case of a large pressure difference between the inside and outside of a valve body, a reduced refrigerant passing noise at a time of switching a flow path, and an easy flow path switching operation, the multi-way selector valve includes a valve body 50 rotated by a flow path switching actuator 15, and a valve main body 60 rotatably holding the valve body 50, the flow path switching actuator is a stepping motor 15 including a rotor 16 placed on the inner peripheral side of a can 38 and a stator 17 placed on an outer periphery of the can 38, and a planetary gear type speed reduction mechanism 40 is inserted between the rotor 16 of the stepping motor 15 and the valve body 50.

2 Claims, 18 Drawing Sheets

MULTI-WAY SELECTOR VALVE

BACKGROUND OF THE INVENTION

1. Field of the Invention

The present invention relates to a multi-way selector valve, e.g., a three-way selector valve or a four-way selector valve, used for a refrigerating cycle, or the like. More particularly, the present invention relates to a rotary type multi-way selector valve properly used on a vehicle, where a valve body is rotated by an actuator having a planetary gear type speed reduction mechanism to switch a flow path.

2. Description of the Conventional Art

A refrigerating cycle such as an air conditioner or a refrigerating device generally includes a four-way selector valve which is a flow path (flow direction) selection means, in addition to a compressor, a gas-liquid separator, a condenser (an outdoor heat exchanger), an evaporator (an indoor heat exchanger), and an expansion valve.

One example of the refrigerating cycle having the four-way selector valve will be described with reference to FIGS. 12 and 13. A refrigerating cycle 300 illustrated in the figures is for an air conditioner, and switching of operation modes (a cooling operation and a heating operation) is made by a four-way selector valve 320. The refrigerating cycle 300 includes a compressor 310, a gas-liquid separator 312, a condenser (an outdoor heat exchanger) 314, an evaporator (an indoor heat exchanger) 316, and an expansion valve 318. The refrigerating cycle 300 has the four-way selector valve 320 between the compressor 310, the gas-liquid separator 312, the condenser 314, and the evaporator 316, and the four-way selector valve 320 has four ports, i.e. first to fourth ports (inlets/outlets) a, b, c, and d (refer to FIG. 13).

These devices are connected each other by a flow path made of a lead pipe (a pipe). More particularly, the refrigerating cycle includes a suction flow path 321, a discharge flow path 322, a condenser-side push return flow path 323, an evaporator-side push return flow path 324, a return flow path 325, a flow path 326, and a flow path 327. The suction flow path 321 introduces a refrigerant in the gas-liquid separator 312 into the compressor 310. The discharge flow path 322 introduces a high-pressure refrigerant discharged from the compressor 310 into the first port a of the four-way selector valve 320. The condenser-side push return flow path 323 connects the second port b of the four-way selector valve 320 with a first distribution port 314a of the condenser 314. The evaporator-side push return flow path 324 connects the third port c of the four-way selector valve 320 and a first distribution port 316a of the evaporator 316. The return flow path 325 connects the fourth port d of the four-way selector valve 320 and a return port 312a of the gas-liquid separator 312. The flow path 326 connects a second distribution port 314b of the condenser 314 and the expansion valve 318. The flow path 327 connects the expansion valve 318 and a second distribution port 316b of the evaporator 316.

In the refrigerating cycle 300 having the aforementioned configuration, when a cooling operation mode is selected, the four-way selector valve 320 switches the flow paths in a state in which the discharge flow path 322 communicates with the condenser-side push return flow path 323 and the evaporator-side push return flow path 324 communicates with the return flow path 325, as illustrated in FIG. 13 (A). At this time, as illustrated with a solid line arrow in FIG. 12, the compressor 310 sucks a low-pressure refrigerant in the gas-liquid separator 312 through the suction flow path 321. A high-temperature and high-pressure refrigerant is introduced from a discharge port 310a of the compressor 310 to the condenser 314 through the discharge flow path 322, the four-way selector valve 320, and the condenser-side push return flow path 323. The condenser 314 condenses the refrigerant by heat exchanging with an outdoor air, and makes a two-phase high-pressure refrigerant. The two-phase high-pressure refrigerant is introduced to the expansion valve 318 through the flow path 326. The expansion valve 318 reduces a pressure of the high-pressure refrigerant. The pressure-reduced low-pressure refrigerant is introduced to the evaporator 316 through the flow path 327. The evaporator 316 evaporates the refrigerant by heat exchanging (cooling) with an indoor air. The low-temperature and low-pressure refrigerant returns from the evaporator 316 to the gas-liquid separator 312 through the evaporator-side push return flow path 324, the four-way selector valve 320, and the return flow path 325.

On the other hand, when a heating operation mode is selected, the four-way selector valve 320 switches the flow paths in a state in which the discharge flow path 322 communicates with the evaporator-side push return flow path 324 and the condenser-side push return flow path 323 communicates with the return flow path 325, as illustrated in FIG. 13 (B). At this time, as illustrated with a broken line arrow in FIG. 12, the compressor 310 sucks the refrigerant in the gas-liquid separator 312 through the suction flow path 321. The high-temperature and high-pressure refrigerant is introduced from the discharge port 310a to the evaporator 316 through the discharge flow path 322, the four-way selector valve 320, and the evaporator-side push return flow path 324. The evaporator 316 evaporates the refrigerant by heat exchanging (heating) with an indoor air, and makes a high-pressure two-phase refrigerant. The high-pressure two-phase refrigerant is introduced to the expansion valve 318 through the flow path 327. The expansion valve 318 reduces the pressure of the high-pressure refrigerant, and the pressure-reduced low-pressure refrigerant is introduced to the condenser 314 through the flow path 326. The condenser 314 condenses the low-pressure refrigerant by heat exchanging with an outdoor air. The low-temperature and low-pressure refrigerant returns from the condenser 314 to the gas-liquid separator 312 through the condenser-side push return flow path 323, the four-way selector valve 320, and the return flow path 325.

Japanese Patent Application Laid-Open No. 2001-295951 discusses a rotary type four-way selector valve to be assembled in the refrigerating cycle as aforementioned. The rotary type four-way selector valve basically includes an actuator for switching flow path, a valve body rotated by the actuator, and a main valve body. The main valve body rotatably holds the valve body, and has a valve seat section and a valve chamber. The valve seat section of the valve main body includes a first inlet/outlet (a condenser communication port), a second inlet/outlet (an evaporator communication port), a high-pressure inlet for introducing a high-pressure refrigerant from the compressor discharge side into the valve chamber, and a low-pressure outlet for deriving a low-pressure refrigerant to the compressor suction side. The four-way selector valve switches the flow paths by rotating the valve body, to make one of the first inlet/outlet and the second inlet/outlet selectively communicate with one of the high-pressure inlet (the valve chamber) and the low-pressure outlet.

Further, as for the flow path switching actuator, a type of an actuator which directly rotates the valve body by a motor including a rotor and a stator is well known. In addition, Japanese Patent Application Laid-Open No. 8-327183 discusses an actuator which pulls the valve body by a solenoid and a plunger to rotate the valve body.

SUMMARY OF THE INVENTION

Problem to be Solved by the Invention

However, the conventional flow path switching actuators, that is, a type directly rotating a valve body by a motor including a rotor and a stator, and a type pulling a valve body with a solenoid and a plunger to rotate the valve body, have a problem that torque for rotating the valve body is low. Particularly, when a pressure difference between the inside and outside of the valve body is extremely large, a flow path switching operation cannot be performed smoothly. Further, in these flow path switching actuators, a flow-path switching speed cannot be finely adjusted. Thus, particularly, when the pressure difference is large, an opening area of a flow path (i.e., a refrigerant passing amount) greatly changes at the time of switching the flow path, and noise easily occurs. Further, the actuator which pulls the valve body by the solenoid and the plunger to rotate the valve body has a problem that the occupation space (volume) of an actuator portion comes to be large. Furthermore, the aforementioned conventional rotary type four-way selector valve introduces a high-pressure refrigerant into the valve chamber, and makes a low-pressure refrigerant flow to a path section in the valve body. Thus, a pressure difference between the inside and outside of the valve body comes to be extremely large, and the valve body is strongly pushed to the valve seat section by the pressure difference (the high-pressure refrigerant). Therefore, the valve body can not rotate smoothly at the time of switching the flow path, and the flow path switching operation comes to be heavy. In addition, there is a problem that the valve body and the valve seat section are abraded easily.

The present invention has been made to solve the aforementioned problems, and an aim of it is to provide a multi-way selector valve capable of making the entire body compact, easily performing a flow path switching operation, and decreasing a refrigerant passing noise at the time of switching a flow path.

In addition, another object of the present invention is to provide a multi-way selector valve having a valve body and a valve seat section, which are hardly abraded and properly used for an on-vehicle refrigerating cycle.

Means for Solving the Problem

According to an aspect of the present invention to achieve the object, a multi-way selector valve basically includes a valve body rotated by a flow path switching actuator, and a valve main body rotatably holding the valve body. The flow path switching actuator is a stepping motor including a rotor placed on the inner peripheral side of a can and a stator placed on an outer periphery of the can. Further, a planetary gear type speed reduction mechanism is inserted between the rotor of the stepping motor and the valve body.

According to a preferred embodiment, the rotor includes a cylindrical main body made of a magnetic body, and a T-section shaped member configuring a top section and a center shaft section thereof. A sun gear which is one of constitutional elements of the planetary gear type speed reduction mechanism is formed on an outer periphery of the center shaft section.

According to another preferred embodiment, the valve body internally includes a high-pressure path section formed for introducing high-pressure fluid. The valve main body includes a valve seat section and a valve chamber. The valve seat section includes a first inlet/outlet and a second inlet/outlet selectively communicating with the outlet side of the high pressure path section. Low-pressure fluid is selectively introduced in the valve chamber through the first inlet/outlet and the second inlet/outlet. At the time of switching a flow path, an outlet-side end section of the high-pressure path section in the valve body slides between the first inlet/outlet and the second inlet/outlet in the valve seat section.

According to a more particular preferred embodiment, the size and shape of the valve body, and the like, is set so as to approximately cancel force in the direction in which the high-pressure fluid pushes the valve body to the valve seat section.

In addition, the valve main body includes a high-pressure inlet and a high-pressure introduction chamber on the actuator side, for introducing the high-pressure fluid into the high-pressure path section of the valve body. A valve seat section can be configured so that a bottom section of the valve chamber on the side opposite to the high-pressure introduction chamber becomes to be the valve seat section including the first inlet/outlet and the second inlet/outlet.

According to yet another preferred embodiment, the valve chamber internally includes the valve seat section including the first inlet/outlet and the second inlet/outlet on the actuator side. A bottom section on the side opposite to the actuator in the valve chamber includes a high-pressure inlet for introducing the high-pressure fluid into the high-pressure path section of the valve body.

According to yet another preferred embodiment, the valve chamber includes a valve seat section including the first inlet/outlet and the second inlet/outlet on the actuator side, and the valve chamber further includes a low-pressure outlet at a side section.

According to yet another preferred embodiment, an outer diameter or a pressure receiving area on the high-pressure inlet side in the valve body is approximately equal to or slightly larger than an inner diameter or a pressure receiving area on the outlet side in the high-pressure path section.

According to yet another preferred embodiment, a sealing member is inserted between the valve body and the valve main body for preventing leaking the high-pressure fluid to the inside of the valve chamber.

According to yet another preferred embodiment, a sleeve-shaped bearing member is inserted between the valve body and the valve main body.

In this case, the bearing members are preferably placed at two places which are at upper and lower sections of the valve main body. Further, the bearing member could be a member having an inner peripheral surface soaked and covered with Teflon. Furthermore, the valve seat section could be made of a material different from that of the valve main body and having low heat conductivity.

In this case, a sealing member is preferably inserted between the valve seat section and the valve main body in order to insulate the flow path of the high-pressure fluid from the flow path of the low-pressure fluid.

Effect of the Invention

The multi-way selector valve according to the present invention includes the planetary gear type speed reduction mechanism inserted between the rotor placed inside the can and the valve body. As a result, a torque loss can be lowered, and an extremely high speed reduction ratio can be obtained without much increasing the occupation space (volume) of the flow path switching actuator. Therefore, the entire multi-way selector valve can be made compact, and the multi-way selector valve can perform a flow path switching operation (rotate the valve body) with high torque. When the pressure difference between the inside and outside of the valve body comes to be extremely large, the multi-way selector valve can smoothly perform the flow path switching operation. Furthermore, the multi-way selector valve can softly perform the flow path switching operation, and can minutely control the flow path switching speed according to the pressure difference. Thus, the multi-way selector valve can decrease the variation of the refrigerant flowing amount at the time of switching the flow path, and can decrease the refrigerant passing noise.

Further, the valve body or the like has such the size and shape as to approximately cancel the force in the direction in which the high-pressure fluid pushes the valve body to the valve seat section. Thus, the multi-way selector valve can easily and lightly perform the flow path switching operation, and the valve body and the valve seat section are hardly abraded. As a result, the multi-way selector valve can be improved in durability and reliability.

BRIEF DESCRIPTION OF THE DRAWINGS

FIG. 1(A) is a longitudinal sectional view of the multi-way selector valve, and FIG. 1(B) is a cross-sectional view taken along the arrows C and C in FIG. 1(A).

FIG. 2(A) is a longitudinal sectional view of the multi-way selector valve, and FIG. 2(B) is a cross-sectional view taken along the arrows C and C in FIG. 2(A).

FIG. 7 (A) illustrates a multi-way selector valve in a cooling operation mode, and FIG. 7 (B) illustrates a multi-way selector valve in a heating operation mode.

FIG. 17 (A) illustrates a multi-way selector valve in a cooling operation mode, and FIG. 17(B) illustrates a multi-way selector valve in a heating operation mode.

FIG. 19 (A) illustrates a multi-way selector valve in a cooling operation mode, and FIG. 19(B) illustrates a multi-way selector valve in a heating operation mode.

DETAILED DESCRIPTION OF PREFERRED EMBODIMENT

The preferred embodiments of a multi-way selector valve of the present invention will be described with reference to the drawings.

Figure 1A:
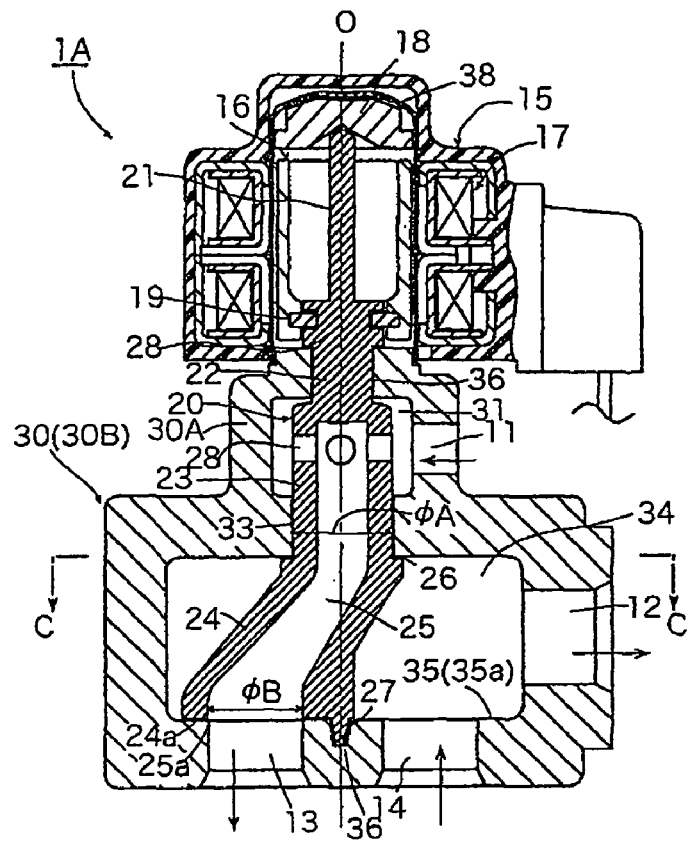
FIGS. 1(A) and 1(B) illustrate a first exemplary embodiment of a multi-way selector valve according to the present invention in a cooling operation mode.
Figure 1B:
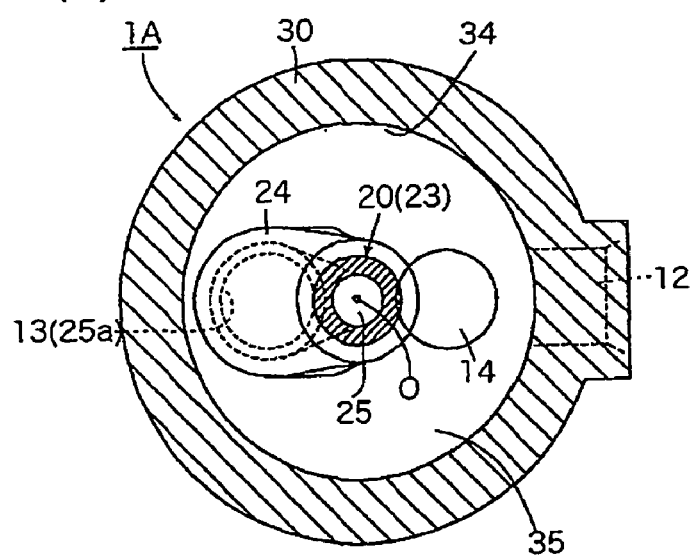
Figure 2A:
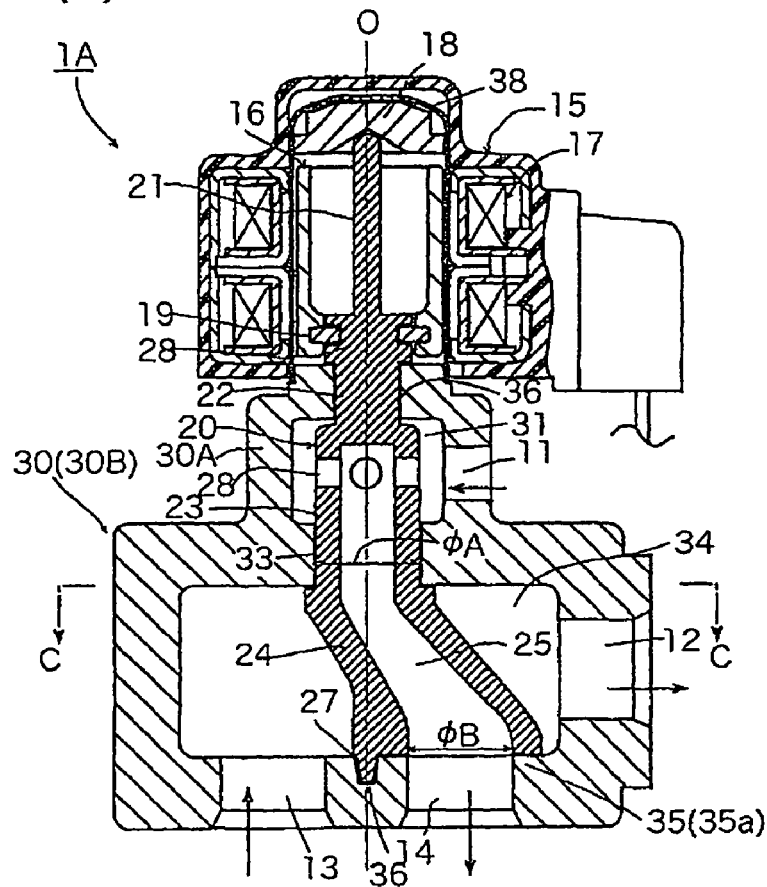
FIGS. 2(A) and 2(B) illustrate the first exemplary embodiment of a multi-way selector valve according to the present invention in a heating operation mode.
Figure 2B:
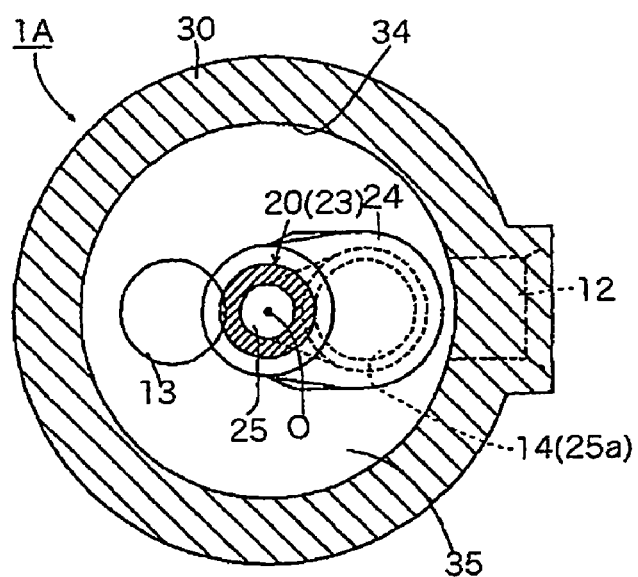
Figure 3:
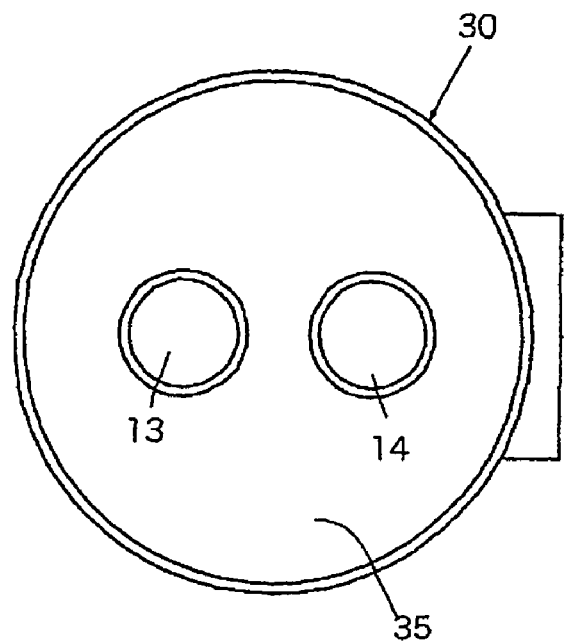
FIG. 3 is a bottom surface view of a multi-way selector valve of the first exemplary embodiment.
Figure 4:
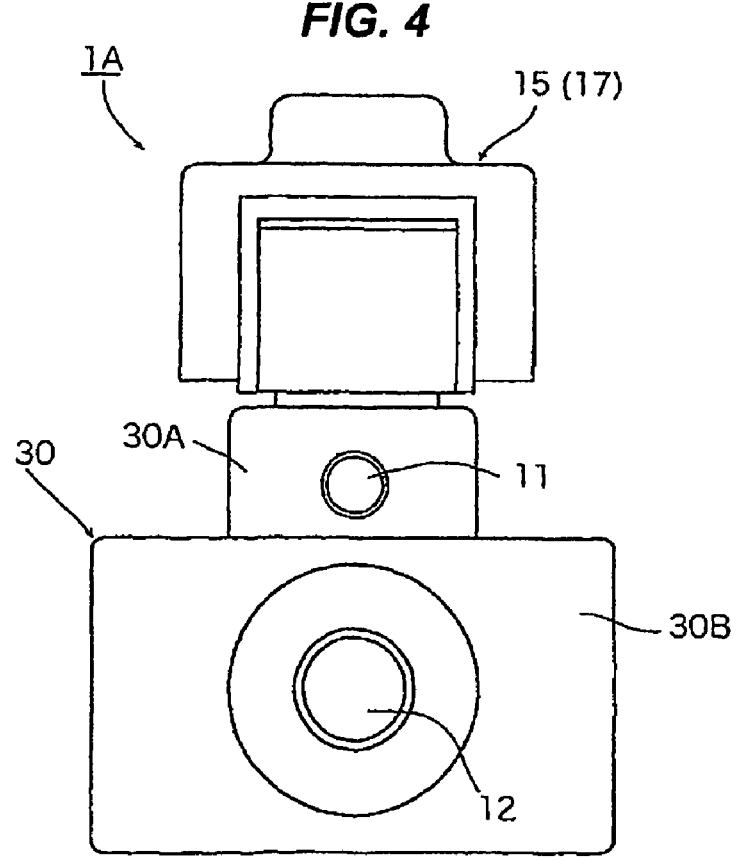
FIG. 4 is a right side view of multi-way selector valve of the first exemplary embodiment.

FIG. 1(A) to FIG. 2(B) illustrate the first exemplary embodiment of a multi-way (four-way) selector valve of the present invention in a cooling operation mode and a heating operation mode. FIGS. 1(A) and 2(A) are longitudinal sectional views. FIGS. 1(B) and 2(B) are cross-sectional view taken along the arrows C and C in FIGS. 1(A) and 2(A) respectively. FIG. 3 is a bottom surface view of the multi-way selector valve. FIG. 4 is a right side view of the multi-way selector valve.

A multi-way selector valve 1A illustrated in FIGS. 1(A) to 4 is a four-way selector valve used for a refrigerating cycle. The multi-way selector valve 1A includes a motor 15 which is a flow path switching actuator, a valve body 20, and a valve main body 30. The motor 15 includes a rotor 16 and a stator 17. The valve body 20 is rotated by the motor 15. The valve main body 30 rotatably holds the valve body 20, has a convex shape in a sectional external shape, and includes an upper chamber forming section 30A and a valve chamber forming section 30B.

The upper chamber forming section 30A of the valve main body 30 includes a high-pressure inlet 11 and a high-pressure introduction chamber 31, which are for introducing a high-pressure refrigerant from the compressor discharge side. The valve chamber forming section 30B of the valve main body 30 includes a valve chamber 34 for introducing a low-pressure refrigerant, and a valve seat section 35 at a bottom part thereof. The valve seat section 35 includes a first inlet/outlet (a condenser communication port) 13 and a second inlet/outlet (an evaporator communication port) 14, which have an equal diameter and are provided symmetrically with respect to a rotary axis O. Further, the valve main body 30 includes a low-pressure outlet 12, which is for deriving a low-pressure refrigerant to the compressor suction side, at a peripheral side section of the valve chamber 34.

The valve body 20 includes an upper end small diameter shaft section 21, a large diameter connection section 26, an upper side shaft section 22, a center shaft section 23, a inclining shaft section 24, and a lower end small diameter shaft section 27. The upper end small diameter shaft section 21 is rotatably held around the center axis (rotary axis) O by an aligning bearing member 18 placed at an upper section in a can 38 of the motor 15. The large diameter connection section 26 integrally connects with (a lower section of) the rotor 16 via connection member 19. The upper side shaft section 22 is rotatably fitted and inserted into an insertion hole 36 provided at a top section of the high-pressure introduction chamber 31. The center shaft section 23 passes through the inside of the high-pressure introduction chamber 31, and is rotatably fitted and inserted into an insertion hole 33 provided at a top section of the valve chamber 34 (a bottom section of the high-pressure introduction chamber 31). The inclining shaft section 24 is placed in the valve chamber 34 and inclines at a predetermined angle in one direction from the center shaft section 23, and a lower end surface 24a of the inclining shaft section 24 is in contact with (a seat surface 35a of) the valve seat section 35. The lower end small diameter shaft section 27 connects with a lower end of the inclining shaft section 24, is borne by a bearing hole 36 formed at a center of the valve seal section 35 (on the rotary axis O), and has an inverse conical shape. The inclining shaft section 24 has a larger diameter toward the lower side. An outer diameter of the lower end surface 24a of the inclining shaft section 24 is fully larger than the port diameters of the first inlet/outlet 13 and the second inlet/outlet 14. Thus, the inclining shaft section 24 is formed to have a size capable of selectively covering the first inlet/outlet 13 and the second inlet/outlet 14.

Further, a high pressure flow path section 25 having an approximate dogleg shape is formed from near the top end of the center shaft 23 to the lower end of the inclining shaft section 24 in the valve body 20. The high pressure path section 25 is for selectively introducing the high-pressure refrigerant in the high-pressure introduction chamber 31 to the first inlet/outlet 13 and the second inlet/outlet 14. A plurality of small diameter inlets 28 are formed on the outer periphery near the upper end of the high pressure path section 25. Further, the high pressure passage section 25 in the inclining shaft section 24 has a larger diameter toward the lower side according to the outer shape of the inclining shaft section 24. The inner diameter of the lower end outlet 25a is set to be approximately equal to the diameters of first inlet/outlet 13 and the second inlet/outlet 14.

In addition, a sealing member, such as an O-ring, which is not illustrated, is inserted between the valve body 20 and the valve main body for preventing leaking the high-pressure refrigerant to the inside of the valve chamber from the high-pressure introduction chamber and the high-pressure path section 25.

The four-way selector valve 1A having the aforementioned configuration switches the flow path by shifting the valve body 20 by 180 degrees from the position illustrated in FIG. 1 to the position illustrated in FIG. 2, and by reversely shifting the valve body 20. That is, the four-way selector valve 1A switches the cooling operation mode and the heating operation mode. In the cooling operation mode, the four-way selector valve 1A makes the first inlet/outlet communicate with the high-pressure path section 25, and makes the second inlet/outlet 14 communicate with the low-pressure outlet 12. In the heating operation mode, the four-way selector valve 1A makes the second inlet/outlet communicate with the high-pressure path section 25, and makes the first inlet/outlet 13 communicate the low-pressure outlet 12.

In addition, in the first exemplary embodiment, an outer diameter $\phi A$ of the center shaft section 33 located on the high-pressure inlet 11 side in the valve body 20 (a pressure receiving area of the pressure applied in the pushing direction) is set to have approximately equal to or slightly larger than an inner diameter $\phi B$ of a lower end outlet section 25a in the high-pressure path section 25 (a pressure receiving area of the pressured applied in the inversely pushing direction), so that the force in the direction in which the high-pressure refrigerant pushes the lower end surface 24a of the valve body 20 to the seat surface 35a of the valve seat section 35 can be approximately canceled.

Figure 14:
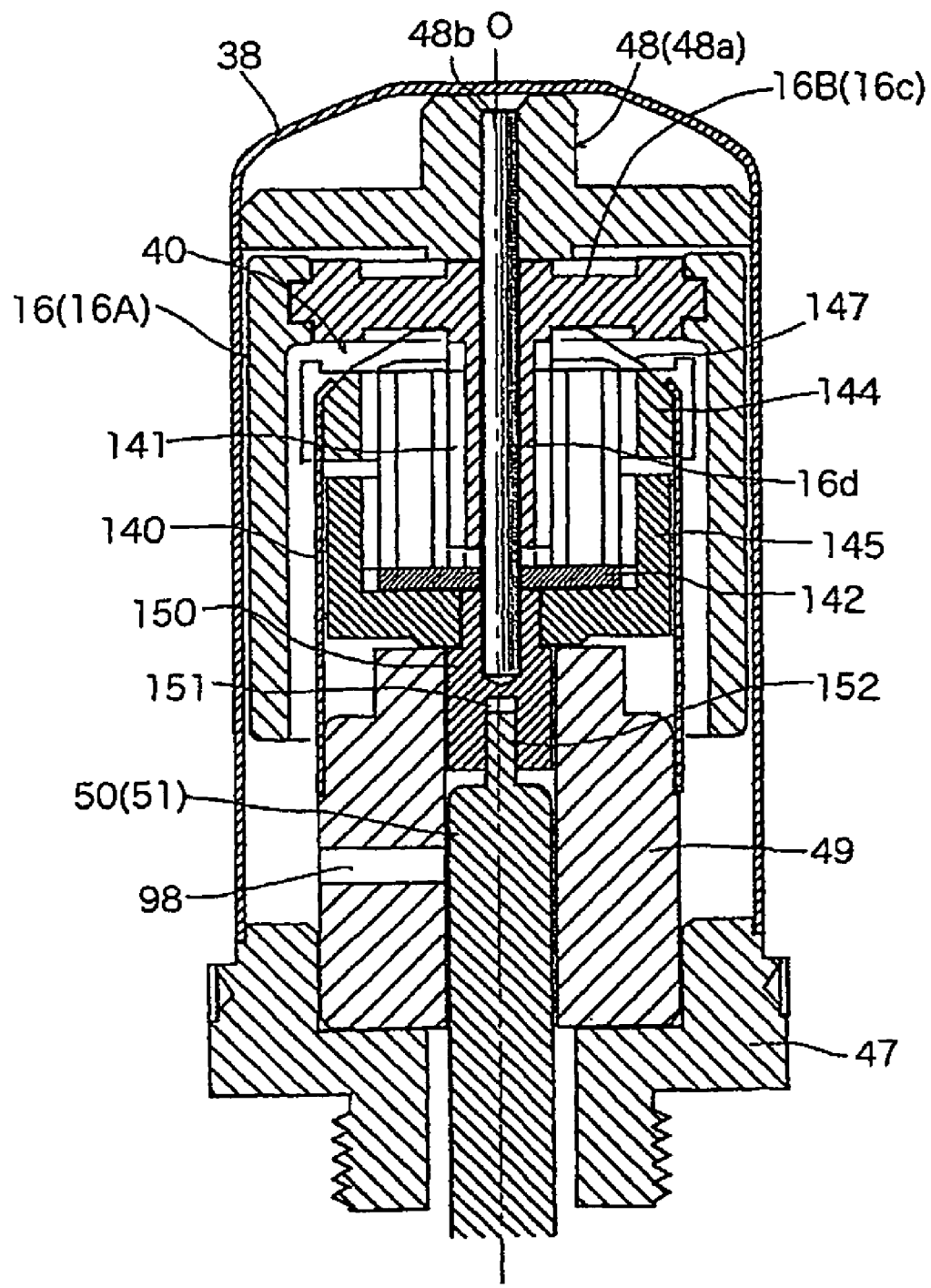
FIG. 14 is an expansion view illustrating a detailed configuration around a rotor and a planetary gear type speed reduction mechanism in multi-way selector valves in the second and third exemplary embodiments illustrated in FIG. 5 and FIG. 8.
Figure 15:
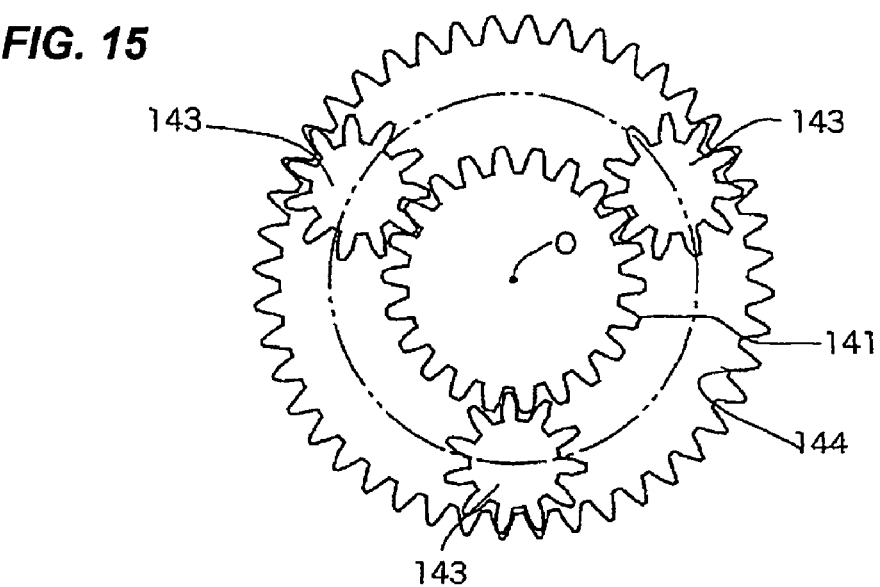
FIG. 15 is a view illustrating the configuration of main parts of a planetary gear type speed reduction mechanism illustrated in FIG. 14.

Accordingly, in the four-way selector valve 1A of the first exemplary embodiment, high-pressure path section 25 for introducing the high-pressure refrigerant is formed in the valve body 20, and the low-pressure refrigerant is introduced into the valve chamber 34. The outer diameter $\phi A$ of the center shaft section 33 of the valve body 20 and the inner diameter $\phi B$ of the lower end outlet section 25a are set so as to approximately cancel the force in the direction in which the high-pressure refrigerant pushes the valve body 20 to the valve seat section 35. Therefore, the four-way selector valve 1A can easily and lightly perform the flow path switching operation, and the valve body 20 and the valve seat section 35 are hardly abraded. As a result, durability and reliability can be improved. In addition, the flow path switching actuator could be an actuator having a planetary gear type speed reduction mechanism inserted between the valve body and the rotor, as illustrated in FIGS. 14 and 15. In this case, the torque loss can be lowered, and the extremely high speed reduction ratio can be obtained without much increasing the occupation space (volume) of the flow path switching actuator. Thus, the entire multi-way selector valve can be made compact, and can softly perform the flow path switching operation (rotate the valve body) with high torque. Even when the pressure difference between the inside and outside of the valve body becomes to be extremely large, the multi-way selector valve can smoothly perform the flow path switching operation. In addition, the actuator in this embodiment can softly change the opening areas of the first and second inlets/outlets, i.e., the refrigerant flowing amount, and can thus suppress the occurrence of noise in comparison with the case of directly driving the valve body by a motor. Further, when the stepping motor is used as the flow path switching actuator, the stepping motor can softly drive the valve body when the pressure difference is large, and quickly drive the valve body when the pressure difference is small, whereby an operational effect of quickly performing the valve switching operation while suppressing the occurrence of noise can be achieved. However, when the actuator has the planetary gear type speed reduction mechanism, such a control of the valve switching operation can be performed more minutely than the case of directly driving the valve body by a motor. Therefore, there is a merit that the actuator having the planetary gear type speed reduction mechanism can exercise the aforementioned operational effect more readily than the conventional actuator.

Figure 5:
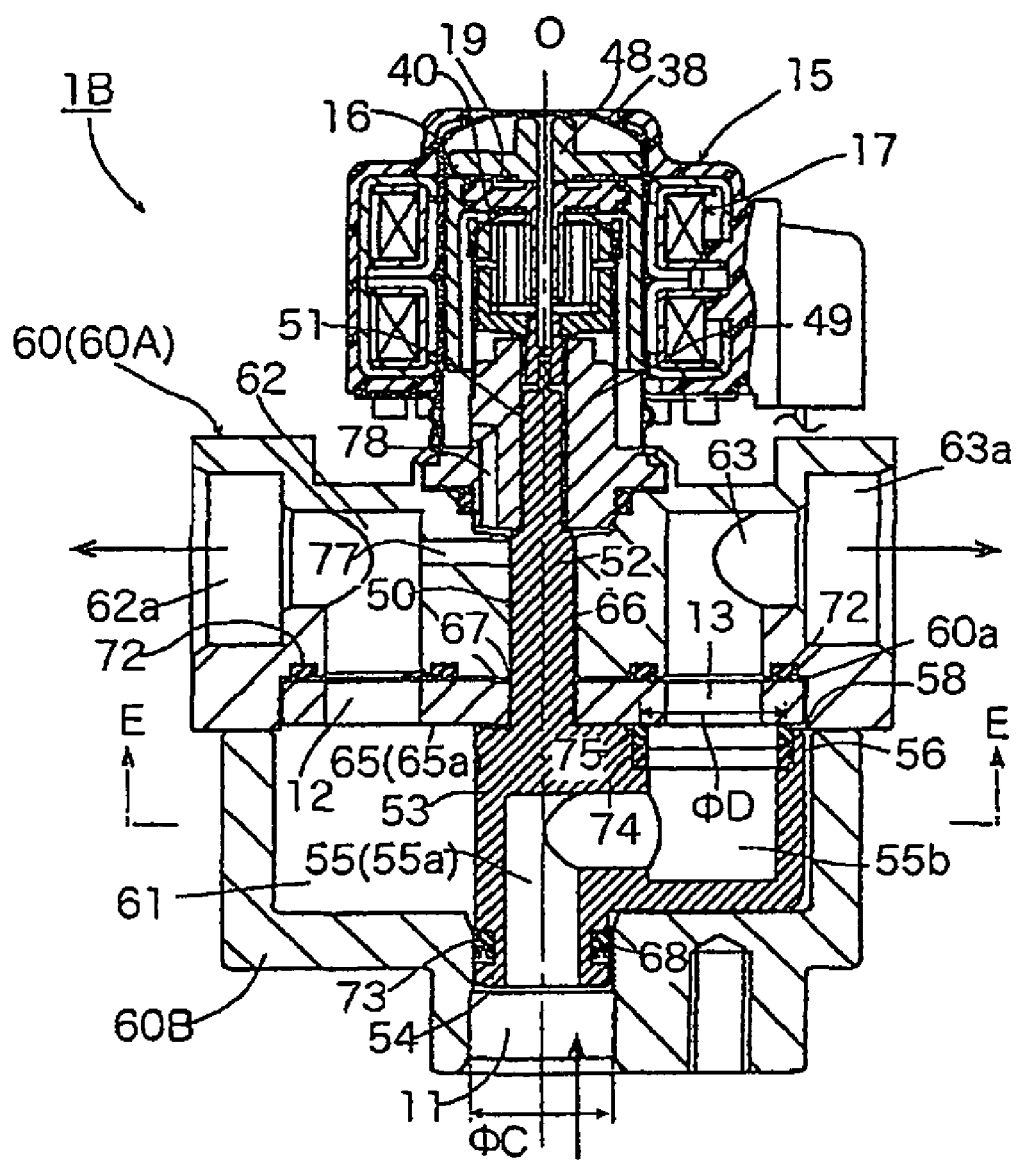
FIG. 5 is a longitudinal sectional view of a second exemplary embodiment of a multi-way selector valve according to the present invention in a cooling operation mode (a sectional view taken along the arrows D and D in FIG. 6).
Figure 6:
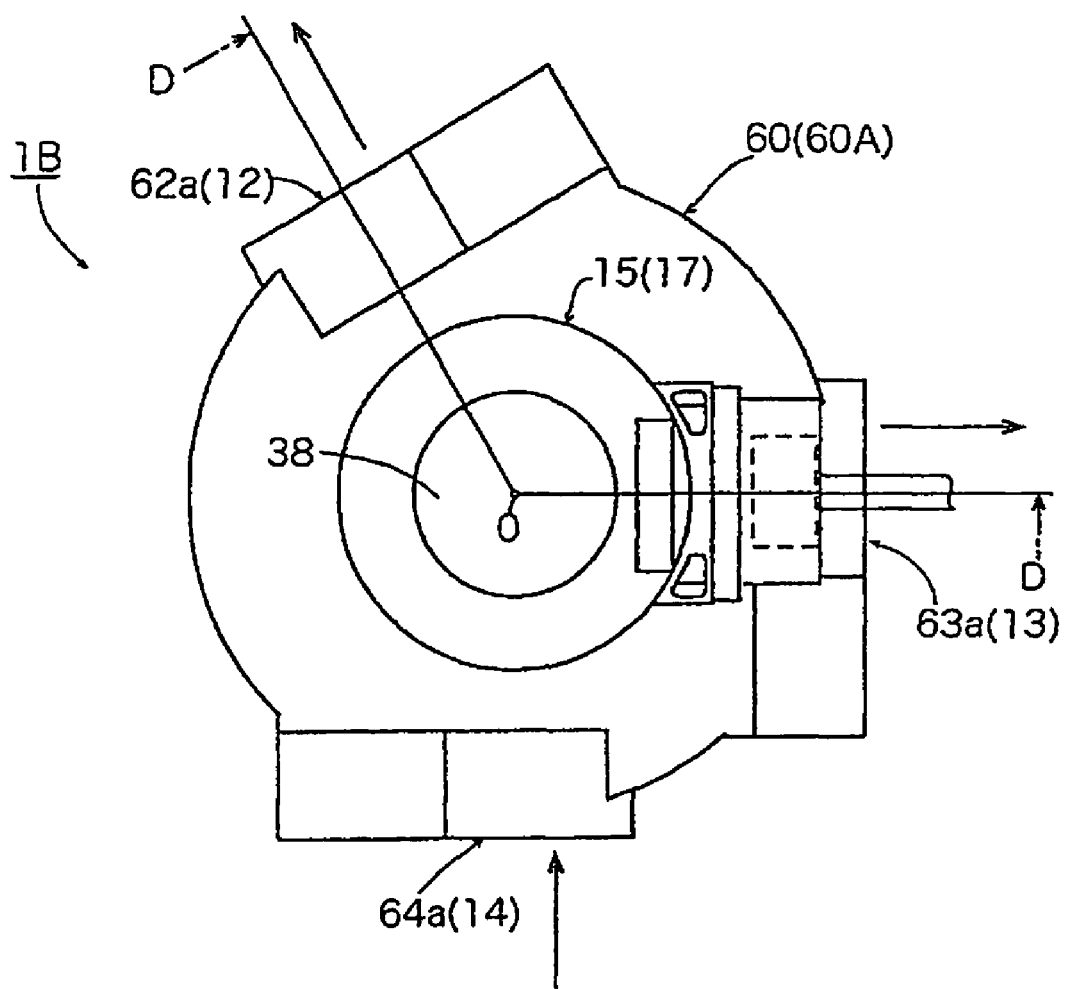
FIG. 6 is a plan view of a multi-way selector valve of the second exemplary embodiment.
Figure 7A:
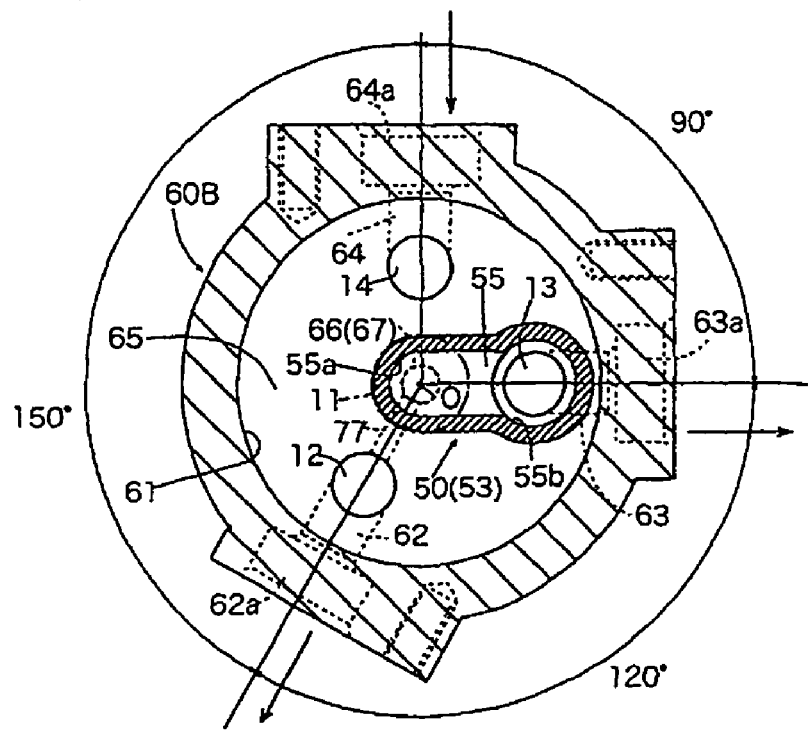
FIGS. 7(A) and 7(B) are cross-sectional views taken along the arrows E and E in FIG. 5.
Figure 7B:
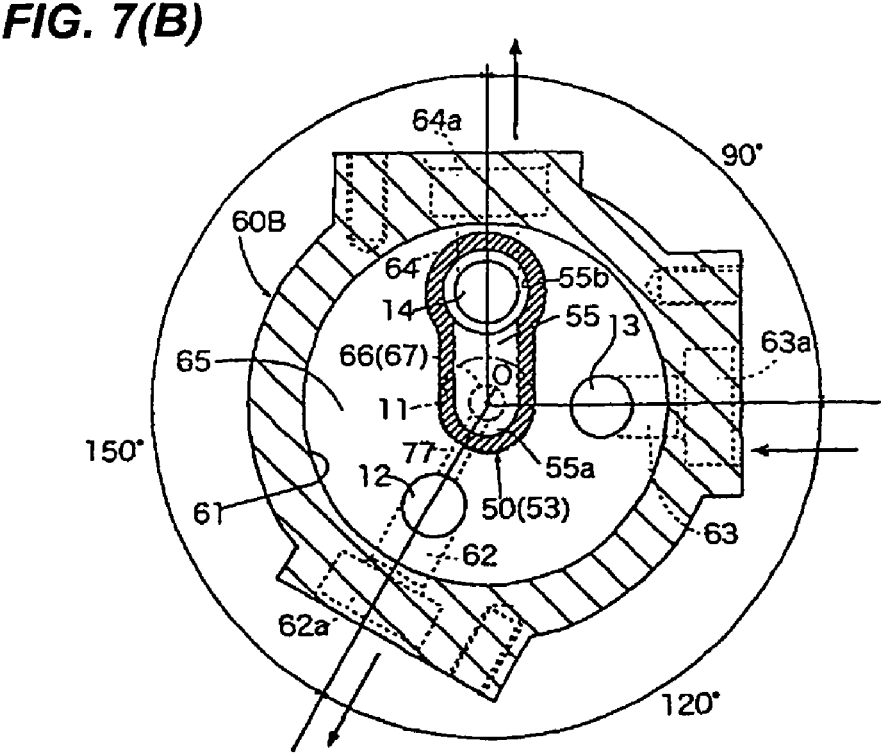

FIG. 5 is a longitudinal sectional view of the second exemplary embodiment of a multi-way (four-way) selector valve according to the present invention in a cooling operation mode, and is taken along the arrows D and D in FIG. 6. FIG. 6 is a plan view of the multi-way selector valve. FIGS. 7(A) and 7(B) are cross-sectional views taken along the arrows E and E in FIG. 5. FIG. 7 (A) illustrates the multi-way selector valve in a cooling operation mode, and FIG. 7(B) illustrates the multi-way selector valve in a heating operation mode. In addition, sections in the figures corresponding to the sections of the multi-way (four-way) selector valve 1A of the first exemplary embodiment are given with the same numerous symbol as those in the first exemplary embodiment, and repetitive descriptions of a part of these sections will be omitted below.

A four-way selector valve 1B illustrated in FIGS. 5 to 7(B) is used for a refrigerating cycle, like the first exemplary embodiment. The four-way selector valve 1B includes a stepping motor 15 which is a flow path switching actuator, a valve body 50, and a valve main body 60. The stepping motor 15 includes a rotor 16 placed on the inner peripheral side of a can 38, and a stator externally fitted and fixed on an outer periphery of the can 38. The valve body 50 is rotated by the stepping motor 15. The valve main body 60 rotatably holds the valve body 50, and has a divided assembly structure including an inlet/outlet forming section 60A and a valve chamber forming section 60B. A rotor holding shaft member 48 is placed on a top section inner periphery of the can 38. In addition, the material of the valve main body 30, or the like, is made of aluminum for reducing the weight.

The four-way selector valve 1B of the second exemplary embodiment includes a planetary gear type speed reduction mechanism 40 inserted between the rotor 16 of the motor 15 and the valve body 50. The rotation speed of the rotor 16 is much reduced, and is transmitted to the valve body 50. In this case, the detailed configurations around the rotor 16 and the planetary gear type speed reduction mechanism 40, and an operational effect of using the planetary gear type speed reduction mechanism will be described below.

The inlet/outlet forming section 60A located on the motor 15 side of the valve main body 60 includes a recessed section 60a, an inversely L-shaped path section 62, an inversely L-shaped path section 63, and an inversely L-shaped path section 64. A valve seat member is fitted and fixed to the recessed section 60a. The valve seat member 65 has a low-pressure outlet 12, a first inlet/outlet 13, and a second inlet/outlet 14, which are provided at proper angular intervals (by 120 degrees, 90 degrees, and 150 degrees in the second exemplary embodiment). The inversely L-shaped path section 62 communicates with the low-pressure outlet 12, and has a low-pressure connection port (joint) 62a opening on a peripheral side section. The inversely L-shaped path section 63 communicates with the first inlet/outlet 13, and has a first connection port (joint) 63a opening on the peripheral side section. The inversely L-shaped path section 64 communicates with the second inlet/outlet 14, and has a second connection port (joint) opening on the peripheral side section.

The valve chamber forming section 60B located on the lower side of the inlet/outlet forming section 60A in the valve main body 60 includes a valve chamber 61 and a high-pressure inlet 11 which is provided on the center of a bottom section (a rotary axis O) of the valve chamber 61.

The valve body 50 includes a small diameter shaft section 51, a center shaft section 52, and an inversely L-shaped shaft section 53 in an order from upper side thereof. The small diameter shaft section 51 connects with the planetary gear type speed reduction mechanism 40 in the motor 15. In the inversely L-shaped shaft section 53, an inversely L-shaped or crank-shaped high-pressure path section 55 is formed to selectively introduce a high-pressure refrigerant from the high-pressure inlet 11 to the first inlet/outlet 13 and the second inlet/outlet 14. The high-pressure path section 55 includes an inversely L-shaped small diameter path section 55a on the high-pressure inlet 11 side, and a large diameter path section 55b on the valve seat member 65 side (the side of the first inlet/outlet 13 and the second inlet/outlet 14). An inner peripheral groove (a concave section) 58 is formed at an outlet-side end section 56 of the large diameter path section 55b for mounting rings 74 and 75 (which will be described below) which are sealing members.

The small diameter shaft section 51 of the valve body 50 is rotatably fitly inserted into a thick cylindrical guide section 49 provided on the motor 15 side. The center shaft section 52 is rotatably fitly inserted into insertion holes 66 and 67 formed on the center (rotary axis O) of the inlet/outlet forming section 60A and the valve seat member 65. The lower end section of the inversely L-shaped shaft section 53 is rotatably inserted into an insertion hole 68 continuously provided on the high-pressure inlet 11 at a center of the bottom section in the valve chamber 61.

Further, a ring 73 having a V-shaped groove which is a sealing member is fitted between an outer periphery of a lower end section 54 of the inversely L-shaped shaft section 53 and an inner periphery of the insertion hole 68, in order to prevent leaking the high-pressure refrigerant to the inside of the valve chamber 61 from the high-pressure path section 55. The four-way selector valve 1B also includes an O-ring 74 and a square-shaped ring 75, which are sealing members and mounted on an inner peripheral groove (a concave section) 58 of an end section 56 (an end section on the outlet side) on the valve seat member 65 side in the high-pressure path section 55. In the embodiment, the high-pressure refrigerant in the high-pressure path section 55 pushes the O-ring 74 in the radially outer direction, and the shape of the cross section of the O-ring 74 changes from a round shape to an ellipse shape. Then, in the four-way selector valve 1B, a one end surface of the square-shaped ring 75 is pushed to the valve seat member 65 by utilizing this change of the shape of the O-ring 74, to thus obtain a sealing effect. Further, the four-way selector valve 1B includes O-rings 72 and 72, which are sealing members, between the valve seat member 65 and the inlet/outlet forming section 60A.

The four-way selector valve 1B having the aforementioned constitution switches the flow path by rotating the valve body 50 by 90 degrees from the position illustrated in FIGS. 5 and 7 (A) and shifting the valve 50 to the position illustrated in FIG. 7 (B), and reversely shifting the valve 50. That is, the four-way selector valve 1B switches the cooling operation mode and the heating operation mode. In the cooling operation mode, the four-way selector valve 1B makes the first inlet/outlet 13 communicate with the high-pressure path section 55, and makes the second inlet/outlet 14 communicate with the low-pressure outlet 12. In the heating operation mode, the four-way selector valve 1B makes the second inlet/outlet 14 communicate with and the high-pressure path section 55, and makes the first inlet/outlet 13 communicate with the low-pressure outlet 12.

In addition, in the second exemplary embodiment, in order to approximately cancel force in the direction of pushing the end section (the square-shaped ring 75) to the valve seat member 65, an outer diameter $\phi C$ (a pressure receiving area of the pressure applied in the pushing direction) of the lower end section 54 of the inversely L-shaped shaft section 53 is set to be approximately equal to or slightly larger than an effective inner diameter $\phi D$ (a pressure receiving area of the pressure applied oppositely to the pushing direction) of a portion of the square-shaped ring 75 contacting with the valve seat member 65. The end section 56 (the square-shaped ring 75) is on the valve seat member side in the high-pressure path section 55. The lower end section 54 of the inversely L-shaped shaft section 53 is located on the high-pressure inlet 11 side in the valve main body 50. The square-shaped ring 75 is mounted on the end section on the valve seat member 65 side (the outlet side) in the high-pressure path section 55.

Accordingly, in the four-way selector valve 1B of the second exemplary embodiment, high-pressure path section 55, in which the high-pressure refrigerant is introduced, is formed in the valve body 50, and the low-pressure refrigerant is introduced into the valve chamber 61. The outer diameter φC of the lower end section 54 of the inversely L-shaped shaft section 53 and the effective inner diameter φD of the square-shaped ring 75 are set so as to approximately cancel the force in the direction of pushing the valve body 50 to the valve seat member 65 by the high-pressure refrigerant. Therefore, the four-way selector valve 1B can easily and lightly perform the flow path switching operation, and the valve body 50 and the valve seat member 65 are hardly abraded. Thus, durability and reliability can be improved.

The four-way selector valve 1B of the second exemplary embodiment includes a horizontal hole 77 for making the insertion hole 66 communicate with the inversely L-shaped path section 62 which communicates with the low-pressure outlet 12 provided at the inlet/outlet forming section 60A. The four-way selector valve 1B also includes an inversely L-shaped vertical hole 78 at the guide section 49, and the vertical hole 78 makes the insertion hole 66 communicate with the inside of the motor 15 (the can 38). Therefore, the pressure of the low-pressure refrigerant introduced into the valve chamber 61 is applied to the inside of the can 38, and the inside of the can 38 is kept constantly at a low pressure.

Since the inside of the motor 15 (the can 38) is kept constantly at a low pressure, the pressure-resistance of the can 38 which is a pressure vessel can be lowered more than the case where the inside of the motor is kept at a high-pressure. More particularly, the thickness of the can 38 can be decreased, and an air gap between the rotor 16 and the stator 17 can be decreased accordingly, or the diameter of the rotor 16 can be increased accordingly. Therefore, the four-way selector valve 1B can be improved in the rotor torque, and can thus perform the flow path switching operation more certainly.

Further, since the inside of the motor 15 is kept at the low pressure, temperature inside the motor 15 can be lowered more than that of the conventional one in which the pressure of high-pressure fluid is applied to the inside of the motor. Thus, the temperature hardly affects parts inside the motor 15. As a result, durability and reliability can be also improved.

In addition, particularly, the four-way selector valve 1B of the second exemplary embodiment is made in accordance with a proper design and a proper material selection for a vehicle use (for a car air-conditioner). That is, the four-way selector valve 1B includes the thinned can 38 and the valve main body 30 made of aluminum, and thus has the decreased size and weight. In addition, by horizontal arrangement of main piping ports (the connection ports 62a, 63a, and 64a) and the like, the piping work can be easily carried out in a narrow engine room.

Figure 8:
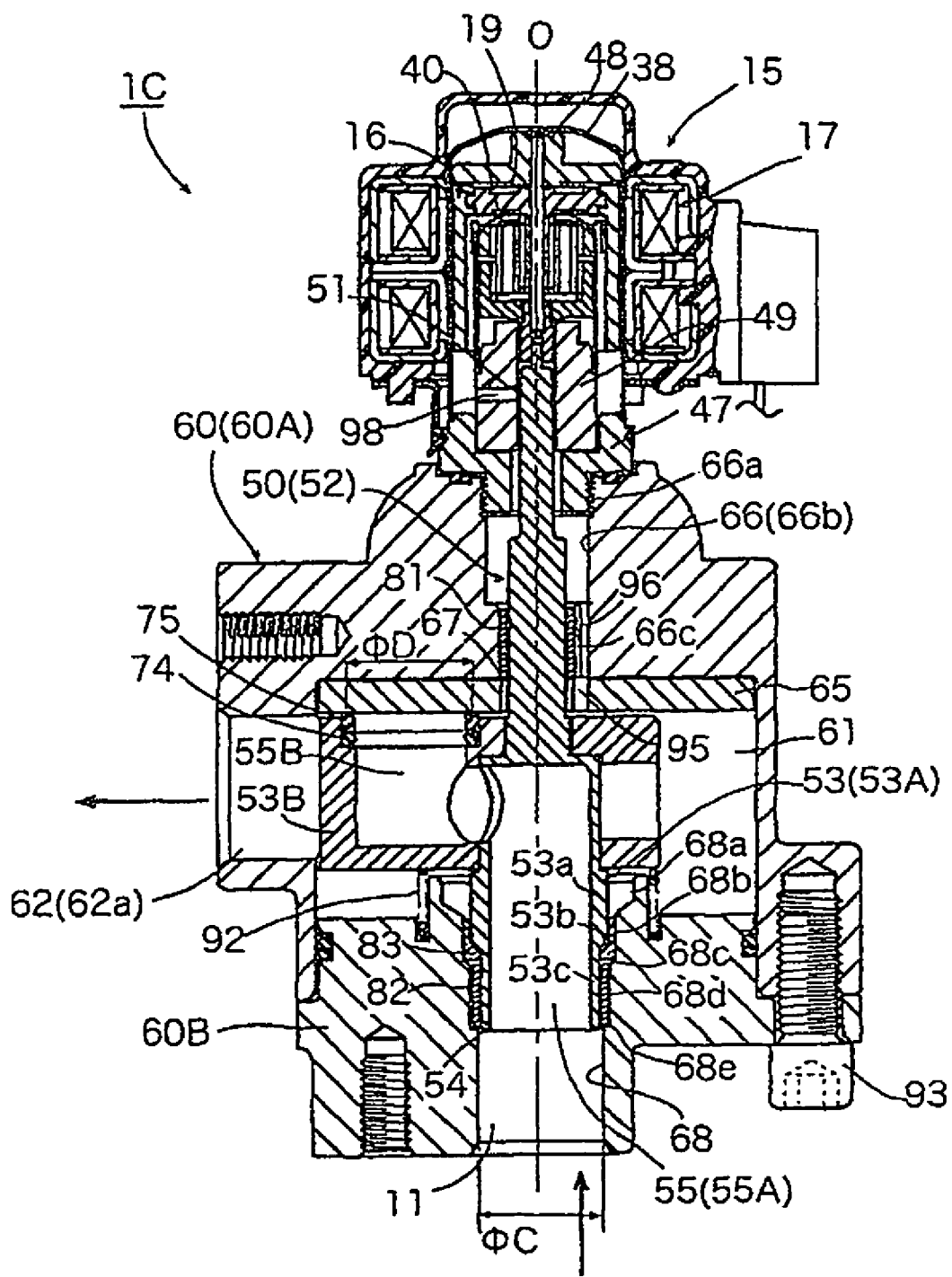
FIG. 8 is a longitudinal sectional view illustrating a third exemplary embodiment of a multi-way selector valve according to the present invention.

FIG. 8 is a longitudinal sectional view of a multi-way (four-way) selector valve 1C of the third exemplary embodiment. The four-way selector valve 1C is formed by improving the four-way selector valve 1B of the second exemplary embodiment, and has a basic configuration similar to that of the four-way selector valve 1B. Sections having similar functions to those of the four-way selector valve 1B are given with the same numerous symbols, and the repetitive description will be omitted. The improved sections (the different sections) will be mainly described below.

In addition, FIG. 8 illustrates a state that the high-pressure path section 55 does not communicate with both the first inlet/outlet 13 and the second inlet/outlet 14 (a state that the valve seat member 65 closes the high-pressure path section 55 at an intermediate position between them).

The four-way selector valve 1C of the third exemplary embodiment also has a configuration similar to that of the second exemplary embodiment regarding described below. In the four-way selector valve 1C, the high-pressure path section 55, in which the high-pressure refrigerant is introduced, is formed in the valve body 50, and the low-pressure refrigerant is introduced into the valve chamber 61. The outer diameter φC of the lower end section 54 of the inversely L-shaped shaft section 53 and the effective inner diameter φD of the square-shaped ring 75 are set so as to approximately cancel the force in the direction in which the high-pressure refrigerant pushes the valve body 50 to the valve seat member 65. Therefore, the four-way selector valve 1C can easily and lightly perform the flow path switching operation, and the valve body 50 and the valve seat member 65 are hardly abraded. As a result, durability and reliability can be improved.

However, the high-pressure path section 55 includes a coaxial path section 55A located on the rotary axis O and an abaxial path section 55B which is apart (eccentric) from the rotary axis O. The coaxial path section 55A is formed in a vertical side section 53A of the inversely L-shaped shaft section 53 configuring the lower section of the valve body 50, and the abaxial path section 55B is formed in a horizontal side section 53B of the inversely L-shaped path section 53. Thus, force P which makes the valve body 50 incline to horizontal side section 53B side is applied by the pressure of the high-pressure refrigerant. Therefore, when the four-way selector valve has a structure similar to that of the four-way selector valve 1B of the second exemplary embodiment, more particularly, when the four-way selector valve has a structure in which only a sealing member 73 is inserted between the valve body 50 and (the insertion hole 68 of) the valve main body 60, the valve body 50 slightly inclines. Thus, there could be problems that the flow path switching operation performed by the valve body 50 becomes to be heavy, the valve body 50, the valve seat member 65, the sealing member 73 and the like are eccentrically abraded, an undesirable leakage easily occurs, and the like. In addition, when the four-way selector valve includes the high-pressure path section 55 in the valve body 50 and switches the flow path by rotating the valve body 50, the aforementioned abaxial path section 55B is definitely necessary. Thus, the aforementioned problems cannot be solved only by changing the shapes of the valve body, the high-pressure path section and the like.

In order to solve the aforementioned problems, the four-way selector valve 1C of the third exemplary embodiment includes sleeve-shaped bearing members 81 and 82 at two places of upper and lower sections of the valve main body 60, and the bearing members 81 and 82 slidably rotatably holds the valve body 50. Further, the four-way selector valve 1C includes a sealing member 83 inserted between the vertical side section 53A of the valve body 50 and the insertion hole 68 of the valve main body 60.

These structures will be described below.

The inlet/outlet forming section 60A configuring the upper section of the valve main body 60 has a stepped insertion hole 66 formed at a center section thereof, for inserting the center shaft section 52 of the valve body 50. The insertion hole 66 includes a large diameter hole section 66b and a small diameter hole section 66c. The large diameter hole section 66b has a female screw section 66a screwing to and connecting with a lower section mounting member 47 of the motor 15. The small diameter hole section 66c is formed on the lower side of the large diameter hole section 66b. The upper side bearing member 81 is internally fitted in the small diameter hole section 66c and the upper side bearing member 81 slidably rotatably holds the center shaft section 52 of the valve body 50. In addition, a lower end of the upper side bearing member 81 engages with a peripheral edge section of an insertion hole 67 formed at a center of the valve seat member 65. Further, the four-way selector valve 1C includes vertical holes 95 and 96 which are formed adjacent to the insertion hole 67 and the small diameter hole section 66c. The vertical holes 95 and 96 make the valve chamber communicate with the large diameter hole section 66b of the insertion hole 66. In addition, the four-way selector valve 1C includes a horizontal hole 98 at the guide section 49, and the horizontal hole 98 makes the insertion hole 66 communicate with the inside of the motor (the can 38). Therefore, like the four-way selector valve 1B of the second exemplary embodiment, the pressure of the low-pressure refrigerant introduced to the valve chamber 61 is applied to the inside of the can 38, and the inside of the can 38 is kept constantly at the low pressure.

On the other hand, the valve chamber forming section 60B configuring the lower section of the valve main body 60 is air-tightly fixed at the inlet/outlet forming section 60A, for example, with three hexagonal socket head bolts 93. The valve chamber forming section 60B has a stepped insertion hole 68 formed at a center section thereof for inserting the vertical side section 53A of the inversely L-shaped shaft section 53 of the valve body 50. In addition, the four-way selector valve 1C has a coil spring 92 between an upper surface section of the valve chamber forming section 60B and the horizontal side section 53B of the inversely L-shaped shaft section 53, to upward and lightly energizes the valve body 50.

The insertion hole 68 includes a funnel-shaped hole section 68a, a large diameter hole section 68b, a conical hole section 68c, a small diameter hole section 68d, a stepped (terrace surface) section 68e, and a high-pressure inlet 11 in an order from a top of the insertion hole 68. The funnel-shaped hole section 68a is for inserting the large diameter shaft section 53a of the vertical side section 53A in the inversely L-shaped shaft section 53 of the valve body 50. The lower side bearing member 82 internally fits to the small diameter hole section 68d, engages with the stepped (terrace surface) section 68e, and the lower side bearing member 82 slidably rotatably holds the small diameter shaft section 68d of the vertical side section 53A in the inversely L-shaped shaft section 53.

Further, a lip seal 83, which is a sealing member, is inserted between a large diameter shaft section 53a and a conical surface section 53b of the vertical side section 53A in the inversely L-shaped shaft section 53 and the large diameter hole section 68b and the conical hole section 68c in the insertion hole 68.

As for the bearing members 81 and 82, a metal pipe, e.g., a steel pipe, or a high strength synthetic resin pipe, in which Teflon is soaked and covered on a porous layer lined on an inner peripheral surface of the pipe, is used. Such the metal pipe or the high strength synthetic resin pipe has low friction coefficient and excellent abrasion resistance.

The lip seal 83 is made of Teflon. The lip seal 83 is made to have a shape corresponding to the shape of a gap formed between the large diameter shaft section 53a and the conical surface section 53b, and the large diameter hole section 68b and the conical hole section 68c, and is inserted between these sections. The lip seal 83 is, unlike the O-ring, fitted without being strongly pressed to be deformed. The lip seal 83 seals the high-pressure refrigerant by lightly contacting the entire inner and outer peripheral surfaces thereof with the large diameter shaft section 53a and the conical surface section 53b, and the large diameter hole section 68b and the conical hole section 68c, and thus prevents the high-pressure refrigerant from leaking to the inside of the valve chamber 61. The contacting surface of the seal lip 83 has extremely low sliding friction resistance.

Accordingly, in the four-way selector valve 1C of this exemplary embodiment, the sleeve-shaped bearing members 81 and 82 are placed at the upper and lower sections of the valve main body 60, to slidably rotatably hold the valve body 50. Further, the seal lip 83 is inserted between the vertical side section 53A of the valve body 50 and the insertion hole 68 of the valve main body 60. Thus, even when the force which makes the valve body 50 incline toward the horizontal side section 53B side is applied by the pressure of the high-pressure refrigerant, the valve body 50 hardly inclines, and the sliding friction resistance to the valve body 50 greatly decreases. Thus, the four-way selector valve 1C can more easily and lightly perform the flow path switching operation, and the valve body 50 and the valve seat member 65 are hardly abraded. As a result, durability and reliability can be improved.

Figure 9:
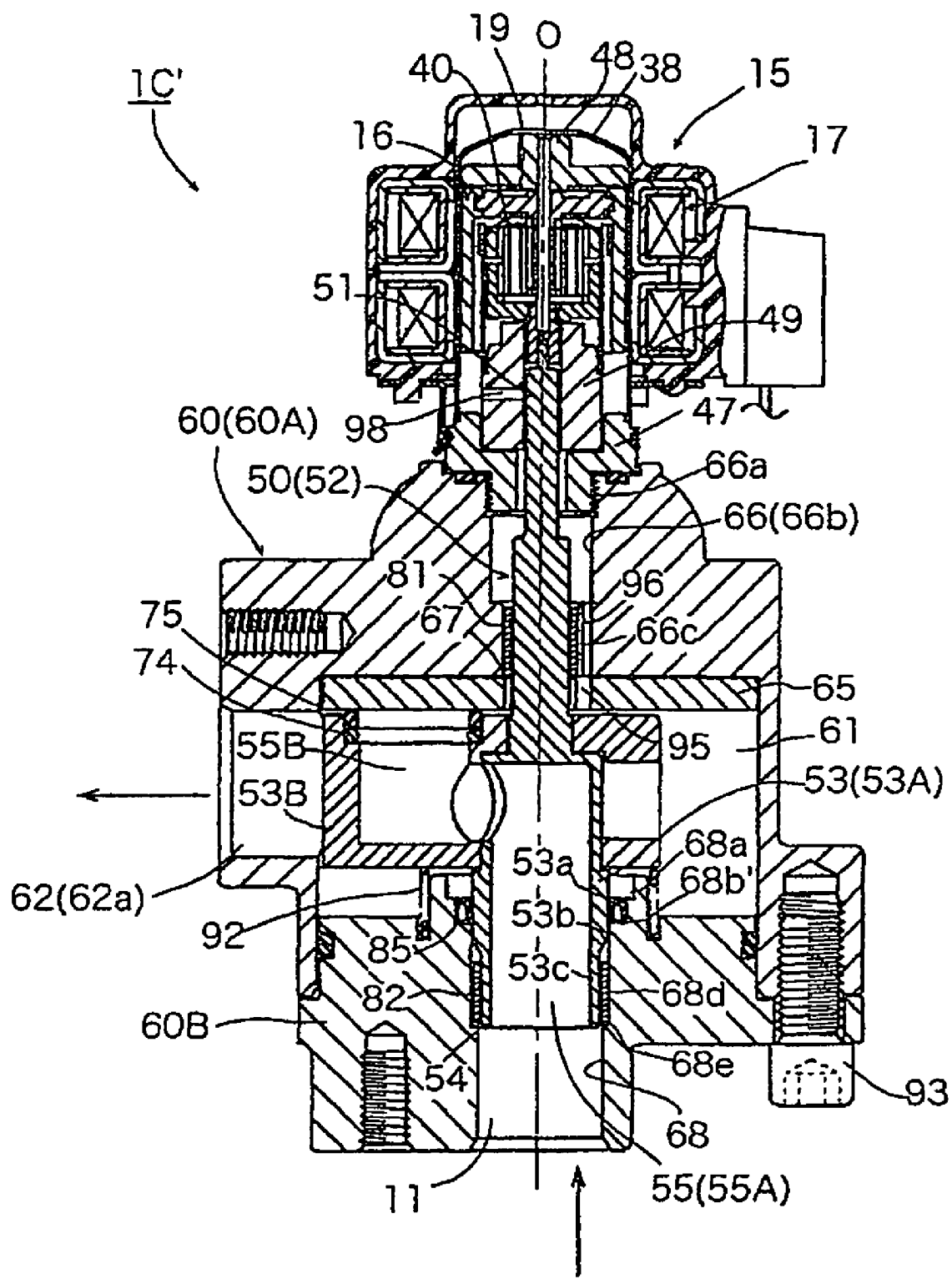
FIG. 9 is a longitudinal sectional view illustrating a modified example 1 of a multi-way selector valve of the third exemplary embodiment.
Figure 10:
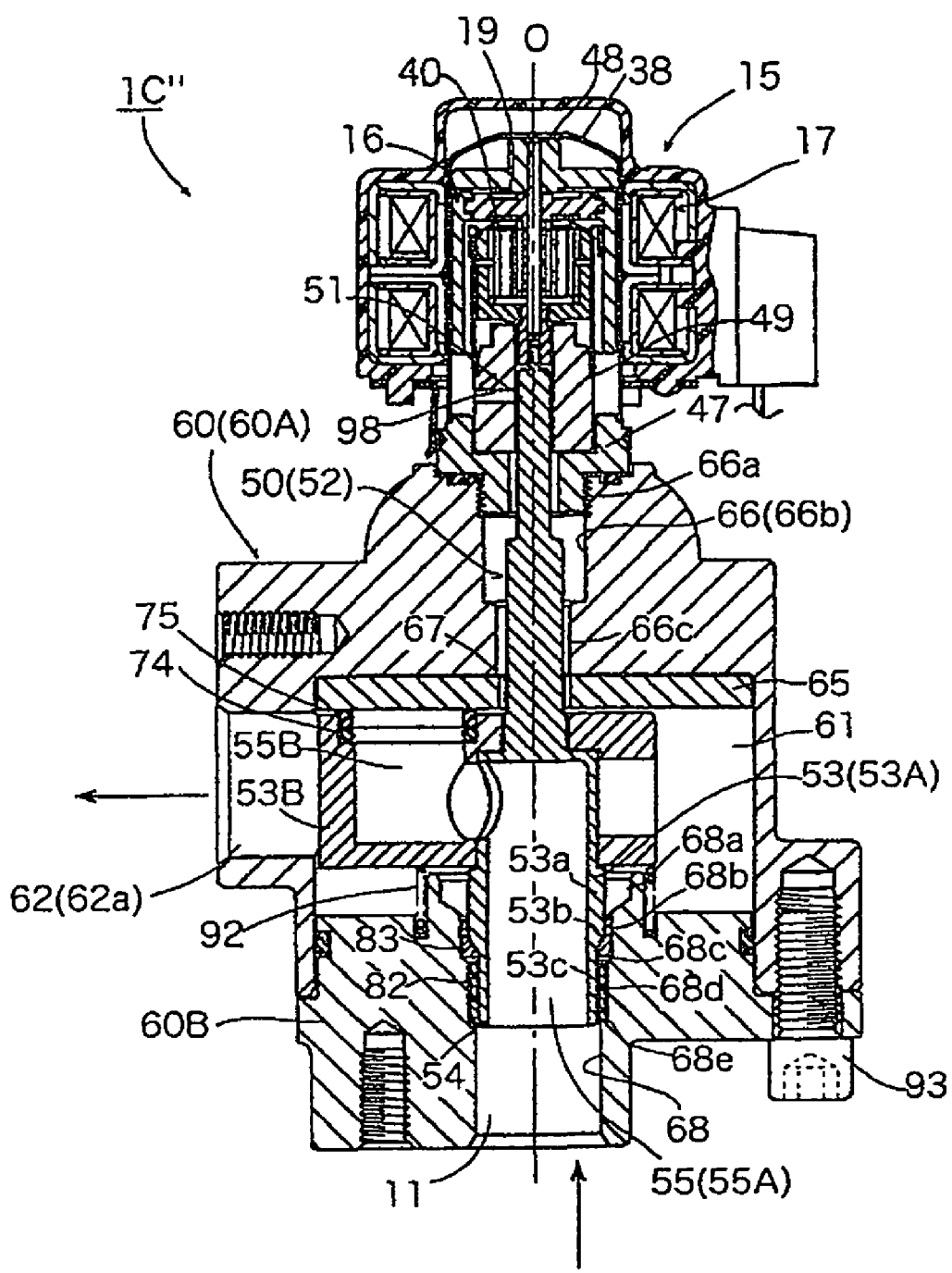
FIG. 10 is a longitudinal sectional view illustrating a modified example 2 of a multi-way selector valve of the third exemplary embodiment.
Figure 11:
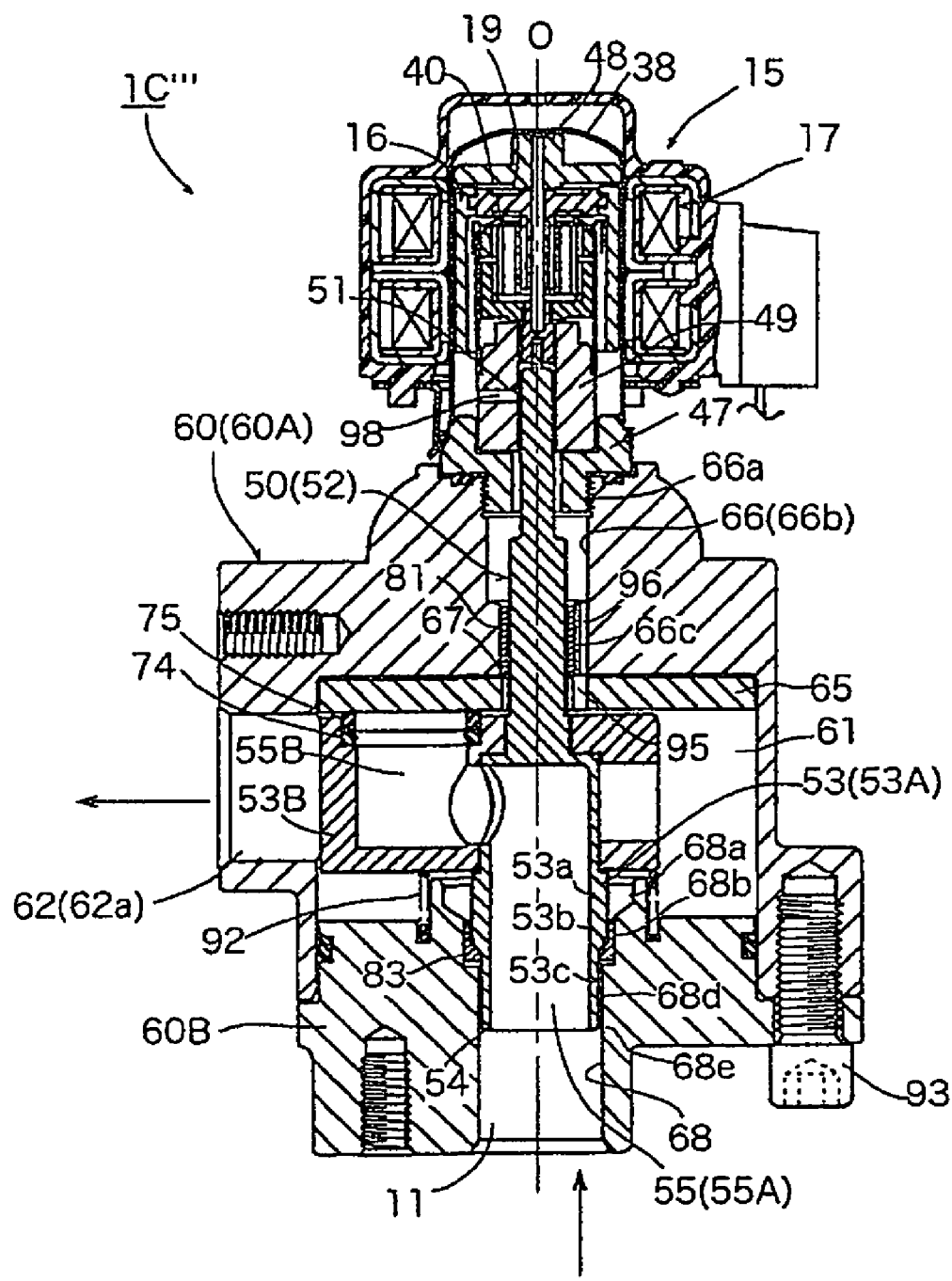
FIG. 11 is a longitudinal cross-sectional view illustrating a modified example 3 of a multi-way selector valve of the third exemplary embodiment.
Figure 12:
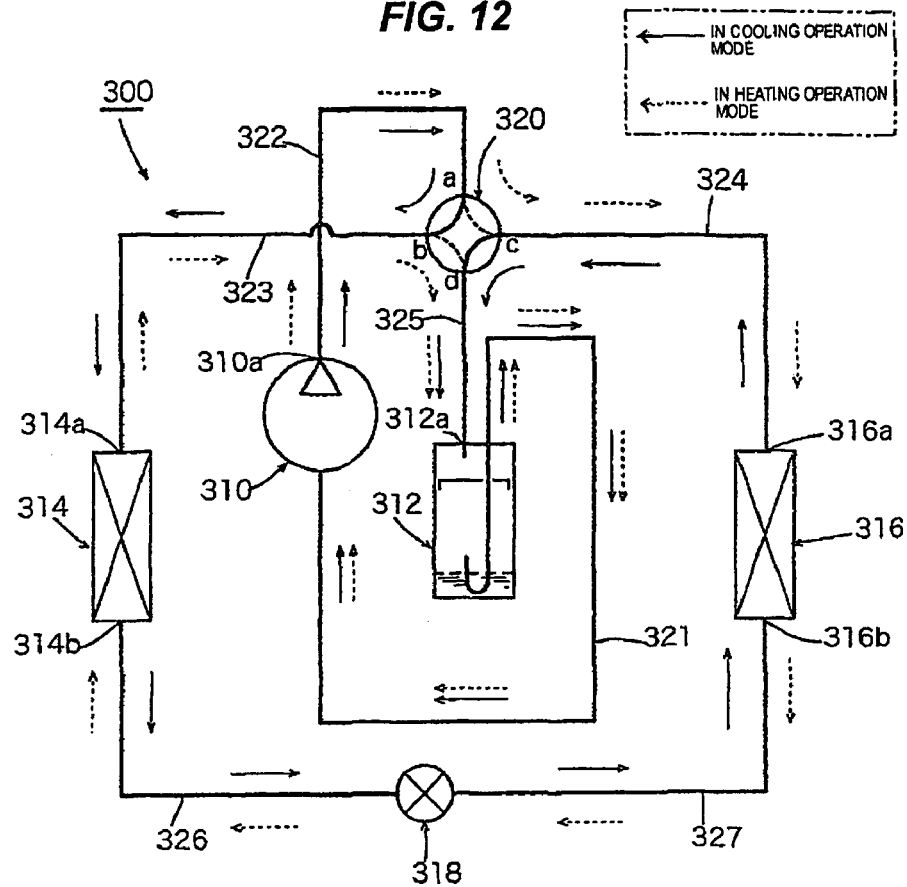
FIG. 12 illustrates one example of a refrigerating cycle using a conventional four-way selector valve.
Figure 13A:
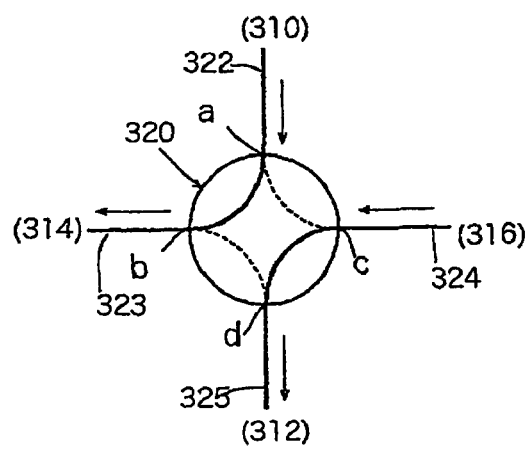
FIGS. 13(A) and 13(B) are views illustrating an operation of the conventional four-way selector valve illustrated in FIG. 12.
Figure 13B:
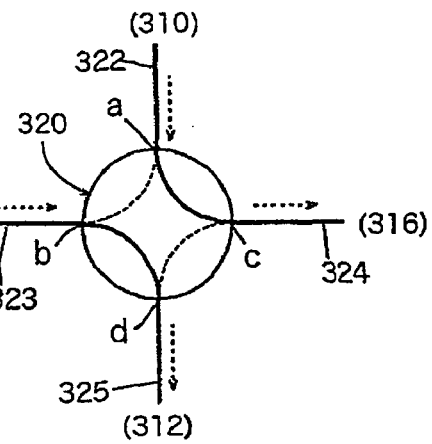

FIGS. 9, 10, and 11 illustrate the modified examples 1, 2, and 3 of the four-way selector valve 1C of the third exemplary embodiment respectively. The modified example 1 (1C') illustrated in FIG. 9 includes a sealing member 85 instead of the lip seal 83. The sealing member 85 is formed by combining a metal ring having an inversely U-shaped or V-shaped cross section and a rubber ring having a portal shaped cross section. The sealing member 85 is a sealing type in which a lower surface opening is pushed and expanded by pressure of fluid.

The modified example 2 (1C") does not include the upper-side bearing member 81 but includes only the lower-side bearing member 82. The modified example 3 (1C''') does not include the lower-side bearing member 82 but includes only the upper-side bearing member 81. These examples can obtain a proper effect, although the effect is inferior to the effect of the four-way selector valve 1C of the third exemplary embodiment.

Then, the detailed configuration around the rotor 16 and the planetary gear type speed reduction mechanism 40 in the second and third exemplary embodiments, and the operational effect obtained by using this configuration will be described with reference to the expanded view of FIGS. 14 and 15.

The planetary gear type speed reduction mechanism 40 is inserted between the valve body 50 and the rotor 16 of the stepping motor 15 which are the flow path switching actuator. The rotor 16 includes a cylindrical main body 16A made of a plastic material including a magnetic material, and a T-sectional shaped member 16B configuring a top section 16c and a center shaft section 16d of the rotor 16. A holding shaft 48b of the rotor holding member 48 placed on a top section inner periphery of the can 38 penetrates the center shaft section 16d. A sun gear 141 which is one constitutional element of the planetary gear type speed reduction mechanism 40 is formed on an outer periphery of the center shaft section 16d.

The planetary gear type speed reduction mechanism 40 is a composite planetary gear mechanism having upper and lower two stages. The planetary gear type speed reduction mechanism 40 includes the sun gear 141, a cylindrical gear case 140, a ring gear 144 (a fixed internal gear), planetary gears 143, an output internal gear 145, a carrier 142, a plate spring 147, and an output shaft 150. The cylindrical gear case 140 is fixed on an upper section of the guide section 49. The ring gear 144 (the fixed internal gear) is held and fixed at an upper section of the gear case 140. For example, three planetary gears 143 are placed between the ring gear 144 and the sun gear 141. The output internal gear 145 has a bottomed cylindrical shape and is placed on the lower side of the ring gear 144. The carrier 142 rotatably holds each of these three planetary gears 143. The plate spring 147 (for preventing the ring gear 144 from floating up and for suppressing vibration noise generated when the rotor is rotated) is placed between the top section 16c of the rotor 16 and the ring gear 144. The output shaft 150 is rotatable together with the output internal gear 145 and held and fixed at a bottom section center of the output internal gear 145.

The holding shaft 48b is fittingly inserted into an upper section center of the output shaft 150. A concave groove 151 having, for example, a rectangular sectional shape is formed at a lower section of the output shaft 150. A rectangular sectional shaped convex section 152 projecting from an upper end of the valve body 50 is fitted to the concave groove 151.

In the planetary gear type speed reduction mechanism 40 having the aforementioned configuration, the sun gear 141 is an input gear, and the planetary gears 143 held by the carrier 142 simultaneously engage with the sun gear 141, the ring gear 144, and the output internal gear 145. The whole of carrier 142 can freely rotate on the output internal gear 145. The ring gear 144 and the output internal gear 145 have a relationship of being dislocated each other, and the numbers of gear teeth of the ring gear 144 and the output internal gear 145 are slightly different. When the planetary gears 143 revolve around the sun gear 141 while rotating and engaging with the ring gear 144, the output internal gear 145 rotates with respect to the fixed ring gear 144 because the numbers of their gear teeth are different. In this case, for example, the speed reduction mechanism 40 reduces the speed of input (rotation) of the sun gear 141 at a large speed reduction ratio of about 50:1, and then outputs the reduced rotation to the output internal gear 145. Therefore, the speed reduction mechanism 40 largely reduces the rotation of the rotor 16 to be about 1/50, and transmits the reduced rotation to the valve body 50.

Accordingly, the multi-way selector valve can decrease a torque loss by inserting the planetary gear type speed reduction mechanism 40 between the valve body 50 and the rotor 16 placed inside the can 38. Further, a large high speed reduction ratio can be obtained without much increasing the occupation space (volume) of the flow path switching actuator portion. Therefore, the entire multi-way selector valve can be made compact, and can perform the flow path switching operation (rotate the valve body 50) with high torque. Even when the pressure difference between the inside and outside of the valve body 50 comes to be extremely large, the multi-way selector valve can smoothly perform the flow path switching operation. Further, the multi-way selector valve can softly change the opening areas of the first and second inlets/outlets, i.e., the passing amount of refrigerant, and can thus suppress the occurrence of noise in comparison with the case of directly driving a valve body by a motor. Further, when the stepping motor is used as the flow path switching actuator, the stepping motor can softly drive the valve body when the pressure difference is large, and can quickly drive the valve body when the pressure difference is small. Thus, an operational effect of quickly performing the valve switching operation while suppressing the occurrence of noise can be achieved. However, when the multi-way selector valve includes the planetary gear type speed reduction mechanism, such a control can be performed more minutely than the case of directly driving the valve body by a motor, and thus the aforementioned operational effect can be much readily exercised.

Therefore, the four-way selector valves 1B and 1C of the second and third exemplary embodiments, can give the effect induced by using the planetary gear type speed reduction mechanism 40, in addition to the effect induced by approximately canceling the force in the direction in which the high pressure refrigerant pushes the valve body 50 to the valve seat member 65. Thus, comparing with the multi-way selector valve 1A of the first exemplary embodiment without using the planetary gear type speed reduction mechanism, and comparing with the conventional valve using a solenoid instead of a motor as the a path switching actuator, the four-way selector valves 1B and 1C can more easily and lightly perform the flow path switching operation, and the valve body 50 and the valve seat member 65 are more hardly abraded. As a result, the four-way selector valves 1B and 1C can be more improved in durability and reliability. In addition, the more detailed configuration of the planetary gear type speed reduction mechanism 40 is discussed in, for example, Japanese Patent Application. Laid-Open No. 2008-101765, the applicant of which is the applicant of the present invention.

Further, because of using the stepping motor 15 as the flow path switching actuator, the rotating position and rotation speed of the valve body 50 can be more arbitrarily and certainly controlled than the conventional case of using a DC motor or a solenoid.

In the aforementioned exemplary embodiments, the four-way selector valves 1A, 1B, and 1C used as a multi-way selector vale for a refrigerating cycle are described. However, when the four-way selector valve is used for the refrigerating cycle, the following problems could occur.

Generally in a refrigerating cycle, a refrigerant at high temperature and high pressure and a refrigerant at low pressure and low temperature flow in a circuit simultaneously, and heat efficiency increases more when the temperature difference between the refrigerant at high temperature and high pressure and the refrigerant at low temperature and low pressure increases more. However, in the refrigerating cycle using the four-way selector valve, the refrigerant at high temperature and high pressure and the refrigerant at low temperature and low pressure flow closely to each other in the four-way selector valve. Thus, since the amount of heat conduction (heat transfer amount) from the refrigerant at high temperature and high pressure to the refrigerant at low temperature and low pressure comes to be large, unignorable heat loss occurs, and heat efficiency thus decreases.

Figure 20A:
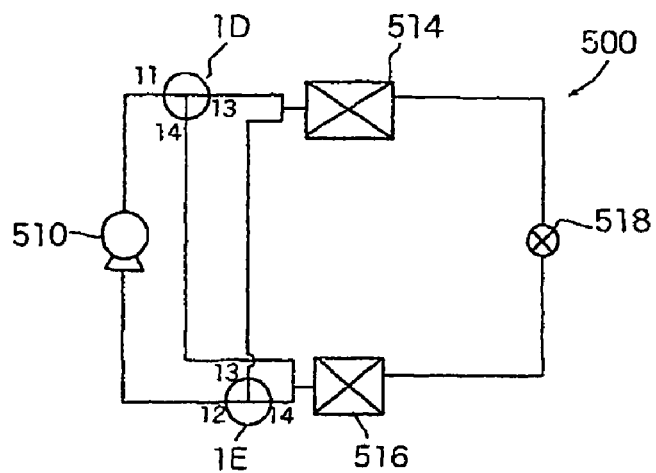
FIGS. 20(A), 20(B) and 20(C) are views illustrating one example of a refrigerating cycle using the multi-way selector valves of the fourth and fifth exemplary embodiments.
Figure 20B:
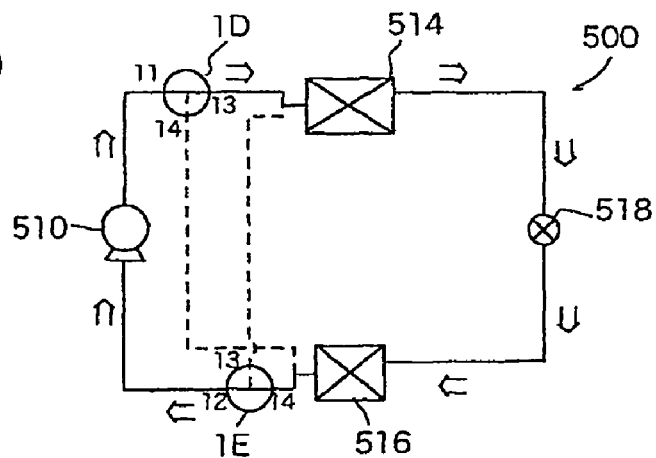
Figure 20C:
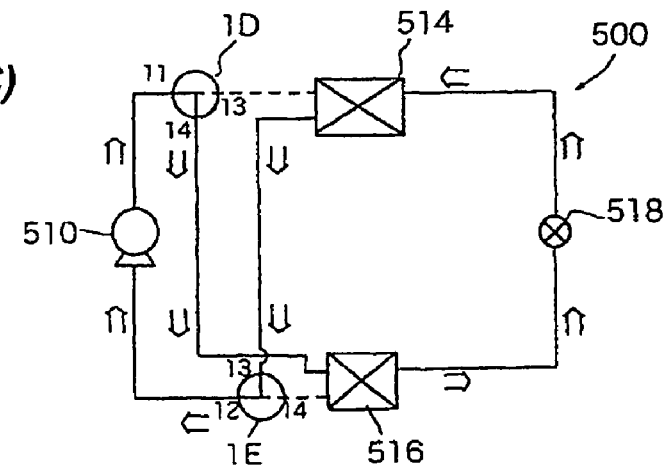

In order to solve these problems, the present inventors propose a technique which switches a cooling operation mode and a heating operation mode by using two (two kinds of) three-way selector valves instead of the four-way selector valve. As illustrated in FIG. 20, the three-way selector valves are used in a refrigerating cycle 500 which includes a compressor 510, a condenser (an outdoor heat exchanger) 514, an evaporator (an indoor heat exchanger) 516, and an expansion valve 518 (the gas-liquid separator, and the like, are omitted to illustrate). More particularly, the refrigerating cycle 500 includes a discharge-side three-way selector valve 1D (a multi-way selector valve of the fourth exemplary embodiment according to the present invention) placed between the compressor 510 (the discharge side) and the condenser 514, and a suction-side three-way selector valve 1E (a multi-way selector valve of the fifth exemplary embodiment according to the present invention) placed between the compressor 510 (the suction side) and the evaporator 516, to switch a flow path by the two three-way selector valves 1D and 1E.

The discharge-side three-way selector valve 1D of the fourth exemplary embodiment, the suction-side three-way selector valve 1E, and the refrigerating cycle 500 using the valves 1D and 1E of the fifth exemplary embodiment will be described below.

Figure 16:
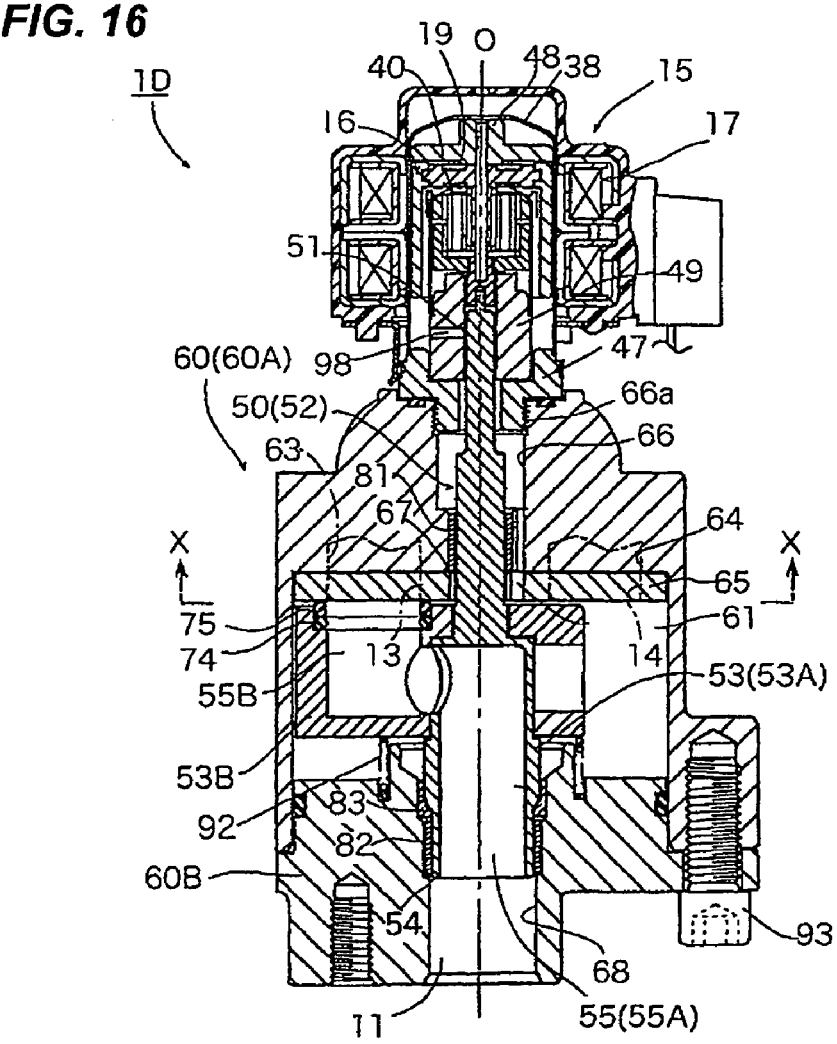
FIG. 16 is a longitudinal sectional view illustrating a fourth exemplary embodiment of a multi-way selector valve according to the present invention.
Figure 17A:
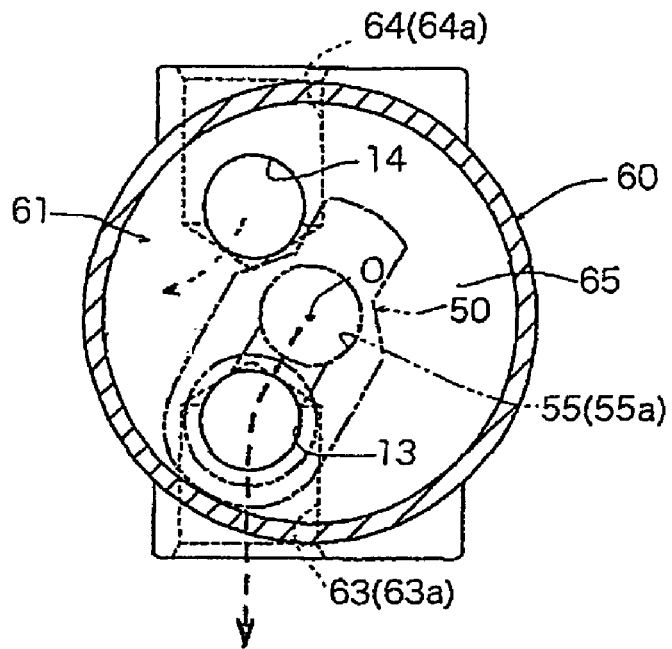
FIGS. 17(A) and 17(B) are cross-sectional views taken along the arrows X and X in FIG. 16.
Figure 17B:
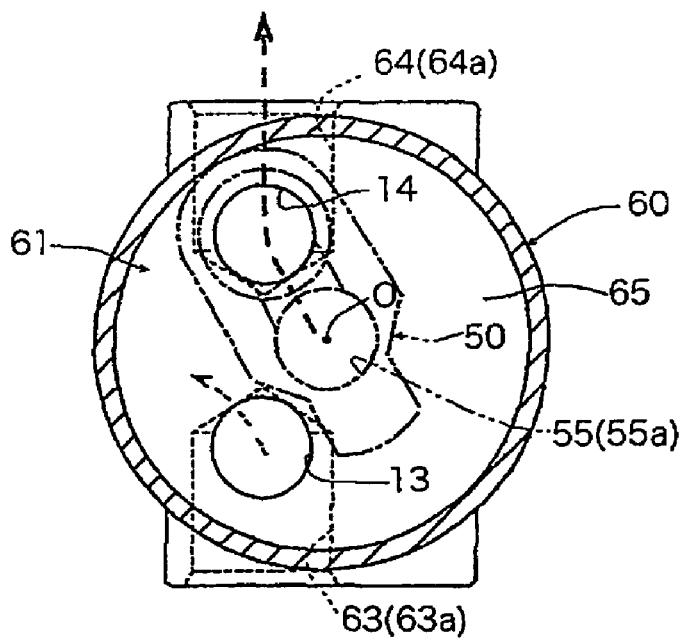
Figure 18:
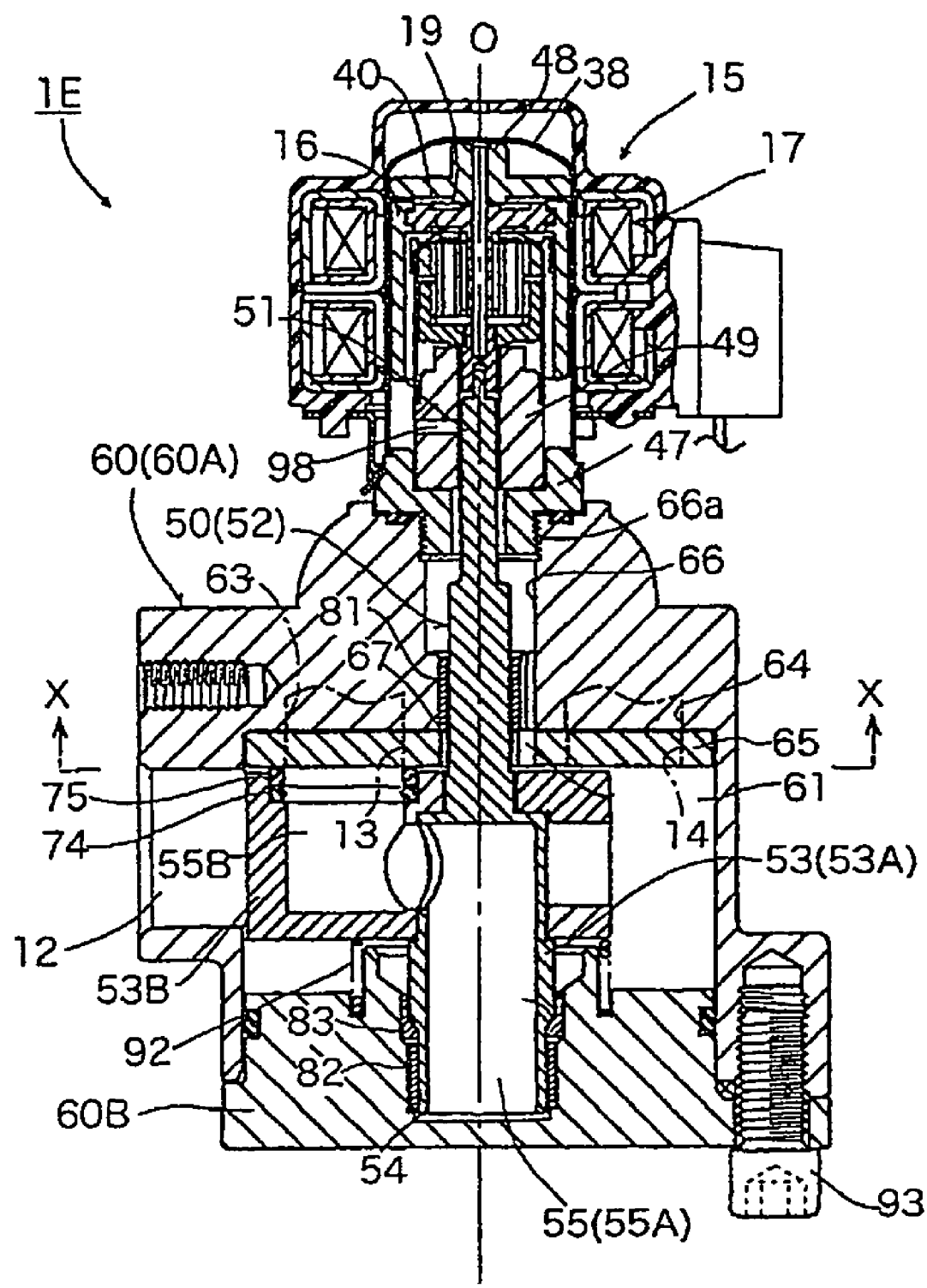
FIG. 18 is a longitudinal sectional view illustrating a fifth exemplary embodiment of a multi-way selector valve according to the present invention.
Figure 19A:
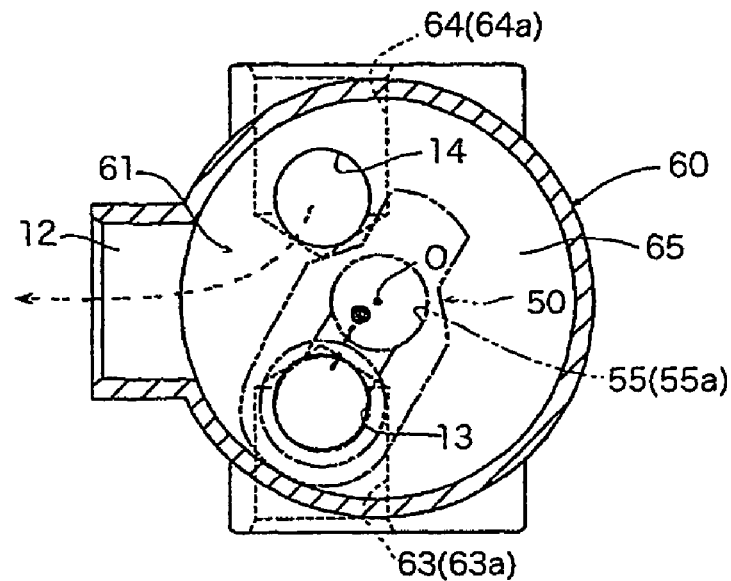
FIGS. 19(A) and 19(B) are cross-sectional views taken along the arrows X and X in FIG. 18.
Figure 19B:
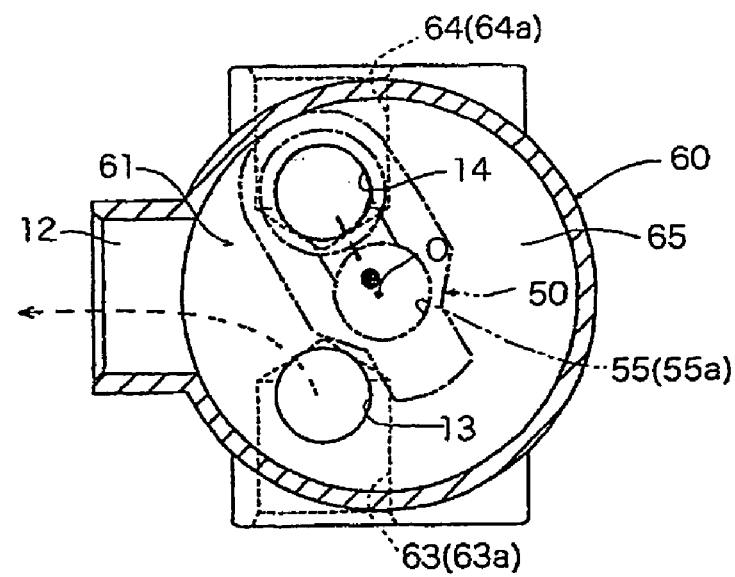

FIG. 16 is a longitudinal sectional view of the discharge-side three-way selector valve 1D of the fourth exemplary embodiment. FIG. 18 is a longitudinal sectional view of the suction-side three-way selector valve 1E of the fifth exemplary embodiment. FIGS. 17(A) and 17(B) are cross-sectional views taken along the arrows X and X in FIG. 16, and FIGS. 19(A) and 19(B) are cross-sectional views taken along the arrows X and X in FIG. 18. FIGS. 17(A) and 19(A) illustrate the three-way selector valve in a cooling operation mode, and FIGS. 17(B) and 19(B) illustrate the three-way selector valve in a heating operation mode.

The illustrated three-way selector valves 1D and 1E are formed by partially modifying the four-way selector valves 1B and 1C of the second and third exemplary embodiments respectively, and have the same basic configuration as those of the second and third exemplary embodiments. Thus, sections having similar functions to those of the four-way selector valves are given with the same numerous symbols, and repetitive description will be omitted. The modified sections (the different sections) will be mainly described below.

The discharge-side three-way selector valve 1D of the fourth exemplary embodiment does not include the low-pressure outlet 12 (62) formed in the four-way selector valves 1B and 1C of the second and third exemplary embodiments. The first inlet/outlet 13 connects with the condenser 514, and the second inlet/outlet 14 connects with the evaporator 516.

On the other hand, the suction-side three-way selector valve 1E of the fifth exemplary embodiment does not include the high-pressure inlet 11 formed in the four-way selector valves 1B and 1C of the second and third exemplary embodiments. The first inlet/outlet 13 connects with the condenser 514, and the second inlet/outlet 14 connects with the evaporator 516.

Then, the operations of (the refrigerant flow in) the discharge-side three-way selector valve 1D, the suction-side three-way selector valve 1E, and the refrigerating cycle 500 will be described separately in the cooling operation mode and in the heating operation mode.

[In Cooling Operation Mode: FIG. 20 (B)]

In the discharge-side three-way selector valve 1D, the valve body 50 is located at the position illustrated in FIG. 17 (A) (the cooling operation mode position), the first inlet/outlet communicates with the high-pressure path section 55, and the second inlet/outlet 14 communicates with the valve chamber 61. Therefore, the high-pressure refrigerant from the compressor 510 flows to the condenser 514, and the low-pressure refrigerant from the evaporator 516 stays in the valve chamber 61.

On the other hand, in the suction side three-way selector valve 1E, the valve body 50 is located at the position illustrated in FIG. 19 (A) (the cooling operation mode position), the second inlet/outlet 14 communicates with the low-pressure outlet 12 through the valve chamber 61, and the first inlet/outlet 13 communicates with the high-pressure path section 55. However, since the suction side three-way selector valve 1E does not include the high-pressure inlet 11, the low-pressure refrigerant from the evaporator 516 flows toward the suction side of the compressor 510, but the high-pressure refrigerant from the condenser 514 stays in (the high-pressure path section 55 in) the valve body 50.

[In Heating Operation Mode: FIG. 20 (C)]

In the discharge-side three-way selector valve 1D, the valve body 50 is located at the position illustrated in FIG. 17 (B) (the heating operation mode position), the second inlet/outlet 14 communicates with the high-pressure path section 55, and the first inlet/outlet 13 communicates with the valve chamber 61. Therefore, the high-pressure refrigerant from the compressor 510 flows to the evaporator 516, and the low-pressure refrigerant from the evaporator 514 stays in the valve chamber 61.

On the other hand, in the suction-side three-way selector valve 1E, the valve body 50 is located at the position illustrated in FIG. 19 (B) (the heating operation mode position), the first inlet/outlet 13 communicates with the low-pressure outlet 12 through the valve chamber 61, and the second inlet/outlet 14 communicates with the high-pressure path section 55. However, since the suction side three-way selector valve 1E does not include the high-pressure inlet 11, the low-pressure refrigerant from the condenser 514 flows toward the suction side of the compressor 510, but the high-pressure refrigerant from the evaporator 516 stays in (the high-pressure path section 55 in) the valve body 50.

Accordingly, the refrigerating cycle 500 includes the discharge-side three-way selector valve 1D (the multi-way selector valve of the fourth exemplary embodiment according to the present invention) placed between the compressor 510 (the discharge side) and the condenser 514, and the suction-side three-way selector valve 1E (the multi-way selector valve of the fifth exemplary embodiment according to the present invention) placed between the compressor 510 (the suction side) and the evaporator 516, to switch the cooling operation mode and the heating operation mode by switching a flow path by using the two three-way selector valves 1D and 1E. As a result, the amount of heat conductance (heat transfer amount) from the refrigerant at high temperature and high pressure to the refrigerant at low temperature and low pressure can be lowered in comparison with the case of using a single four-way selector valve, and the heat efficiency of the refrigerating cycle can be improved.

Then, a multi-way selector valve of the sixth exemplary embodiment according to the present invention will be described with reference to FIG. 21 (a partial cutaway side view).

Figure 21:
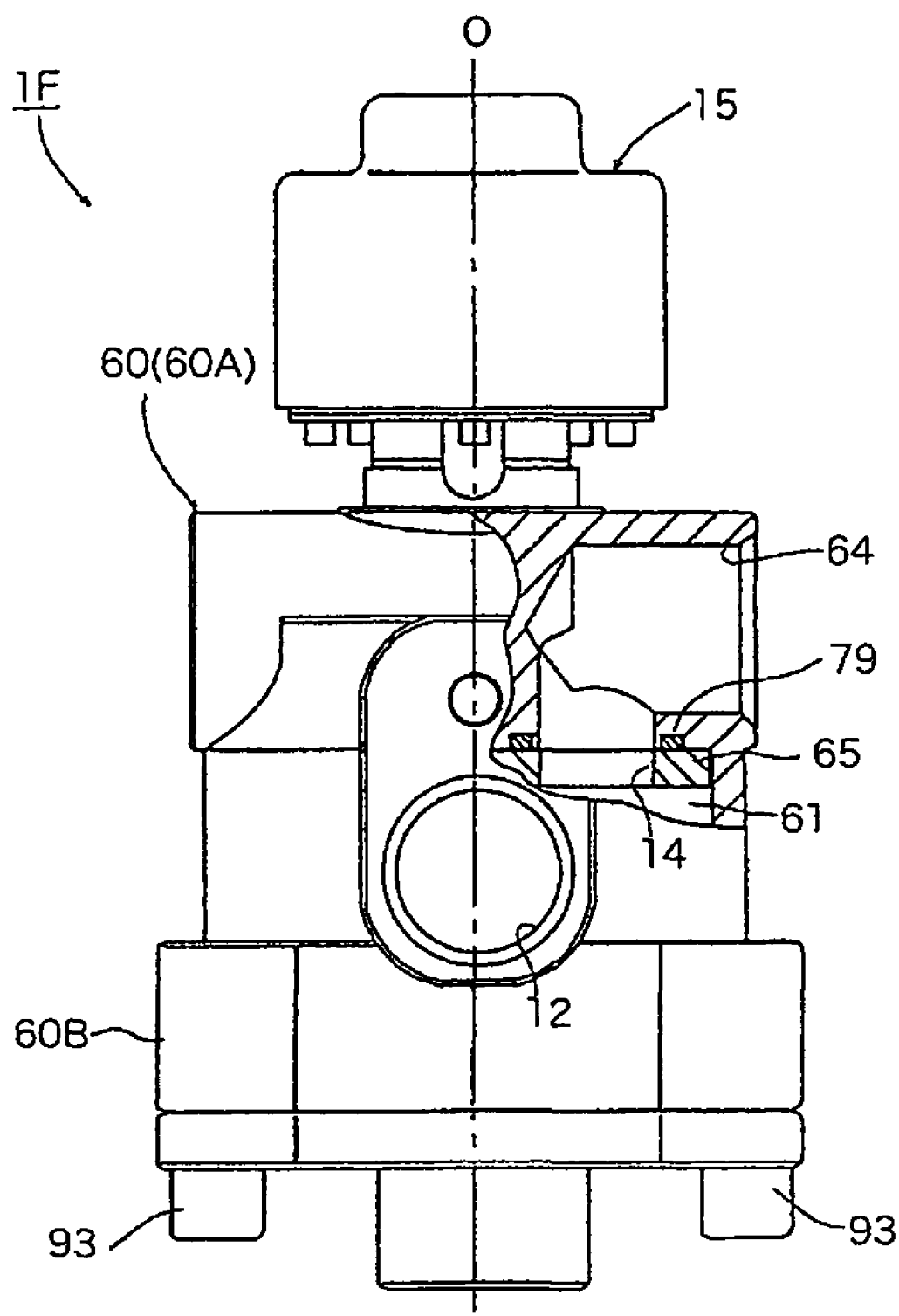
FIG. 21 is a partial cutaway side view illustrating a sixth exemplary embodiment of a multi-way selector valve according to the present invention.

In a multi-way selector valve 1F of the sixth exemplary embodiment in FIG. 21, the valve seat section 65 is made of a different material from that of the valve main body 60. The valve seat section 65 is made of a low heat conductivity material (e.g., stainless, PPS or the like). In addition, the multi-way selector valve 1F includes a sealing member 79, such as an O-ring, between the valve seat section 65 and the valve main body 60, to insulate the flow path of the high-pressure fluid from the flow path of the low-pressure fluid. As a result, the amount of heat conductance (heat transfer amount) from the refrigerant at high temperature and high pressure to the refrigerant at low temperature and low pressure can be lowered more, and the heat efficiency of the refrigerating cycle can be more improved. In addition, the configuration of the multi-way selector valve 1F can be applied to a multi-way selector valve other than the three-way selector valve.

What is claimed is:

1. A multi-way selector valve comprising a valve body rotated by a flow path switching actuator, and a valve main body rotatably holding the valve body, wherein the flow path switching actuator is a stepping motor comprising a rotor placed on the inner peripheral side of a can, and a stator placed on an outer periphery of the can;

wherein a planetary gear type speed reduction mechanism is inserted between the rotor of the stepping motor and the valve body;

wherein the valve body internally comprises a high-pressure path section formed for introducing high-pressure fluid;

wherein the valve main body comprises a valve seat section having a first inlet/outlet and a second inlet/outlet;

wherein the first inlet/outlet and the second inlet/outlet selectively communicate with the outlet side of the high-pressure path section;

wherein the valve main body further comprises a valve chamber for selectively introducing low-pressure fluid through the first inlet/outlet and the second inlet/outlet;

wherein, when the multi-way selector valve switches a flow path, an outlet-side end section of the high-pressure path section in the valve body slides between the first inlet/outlet and the second inlet/outlet in the valve seat section; and wherein one or more paths are formed to substantially communicate the valve chamber to which the low-pressure fluid is introduced with an inside of the can.

2. A multi-way selector valve comprising a valve body rotated by a flow path switching actuator, and a valve main body rotatably holding the valve body, wherein the flow path switching actuator is a stepping motor comprising a rotor placed on the inner peripheral side of a can, and a stator placed on an outer periphery of the can;

wherein a planetary gear type speed reduction mechanism is inserted between the rotor of the stepping motor and the valve body;

wherein the valve body internally comprises a high-pressure path section formed for introducing high-pressure fluid;

wherein the valve main body comprises a valve seat section having a first inlet/outlet and a second inlet/outlet;

wherein the first inlet/outlet and the second inlet/outlet selectively communicate with the outlet side of the high-pressure path section;

wherein the valve main body further comprises a valve chamber for selectively introducing low-pressure fluid through the first inlet/outlet and the second inlet/outlet;

wherein, when the multi-way selector valve switches a flow path, an outlet-side end section of the high-pressure path section in the valve body slides between the first inlet/outlet and the second inlet/outlet in the valve seat section;

wherein the valve body is formed to have the size and shape so as to approximately cancel force in the direction in which the high-pressure fluid pushes the valve body to the valve seat section; and wherein one or more paths are formed to substantially communicate the valve chamber to which the low-pressure fluid is introduced with an inside of the can.

\* \* \* \* \*